(12) United States Patent
Suzuki et al.

(10) Patent No.: US 9,622,100 B2
(45) Date of Patent: Apr. 11, 2017

(54) BASE STATION APPARATUS, TERMINAL APPARATUS, INTEGRATED CIRCUIT, AND RADIO COMMUNICATION METHOD

(71) Applicant: Sharp Kabushiki Kaisha, Osaka-shi, Osaka (JP)

(72) Inventors: Shoichi Suzuki, Osaka (JP); Tatsushi Aiba, Osaka (JP); Kazunari Yokomakura, Osaka (JP); Daiichiro Nakashima, Osaka (JP); Kimihiko Imamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 67 days.

(21) Appl. No.: 14/769,870

(22) PCT Filed: Mar. 4, 2014

(86) PCT No.: PCT/JP2014/055504
§ 371 (c)(1),
(2) Date: Aug. 24, 2015

(87) PCT Pub. No.: WO2014/136790
PCT Pub. Date: Sep. 12, 2014

(65) Prior Publication Data
US 2016/0007220 A1 Jan. 7, 2016

(30) Foreign Application Priority Data
Mar. 5, 2013 (JP) .................................. 2013-042980

(51) Int. Cl.
*H04W 24/08* (2009.01)
*H04L 1/00* (2006.01)
(Continued)

(52) U.S. Cl.
CPC ............... *H04W 24/08* (2013.01); *H04L 1/00* (2013.01); *H04L 1/188* (2013.01); *H04L 1/1861* (2013.01);
(Continued)

(58) Field of Classification Search
None
See application file for complete search history.

(56) References Cited

U.S. PATENT DOCUMENTS

| 8,934,424 B2 * | 1/2015 | Yin ................... H04W 72/0446 370/329 |
| 2009/0312008 A1 * | 12/2009 | Lindoff ................. H04L 25/022 455/423 |

(Continued)

OTHER PUBLICATIONS

Official Communication issued in International Patent Application No. PCT/JP2014/055504, mailed on Apr. 1, 2014.
(Continued)

*Primary Examiner* — Brian Roberts
(74) *Attorney, Agent, or Firm* — Keating & Bennett, LLP

(57) ABSTRACT

A terminal apparatus that communicates with a base station apparatus includes a configuration unit that sets a first configuration, a second configuration, and a third configuration. The configuration unit starts or restarts the timer when setting the third configuration, and the configuration unit clears/discards the third configuration when the timer expires. The first configuration is used to determine correspondence between a subframe in which PDCCH is arranged and a subframe in which PUSCH corresponding to the PDCCH is arranged, the second configuration is used to determine correspondence between a subframe in which PDSCH is arranged and a subframe in which a HARQ-ACK corresponding to the PDSCH is transmitted, and the third configuration is used to specify an uplink subframe in which uplink transmission is possible.

6 Claims, 17 Drawing Sheets

(51) Int. Cl.
*H04L 1/18* (2006.01)
*H04L 5/14* (2006.01)
*H04L 5/00* (2006.01)

(52) U.S. Cl.
CPC .......... *H04L 5/0048* (2013.01); *H04L 5/0055* (2013.01); *H04L 5/14* (2013.01); *H04L 5/0007* (2013.01)

(56) References Cited

U.S. PATENT DOCUMENTS

| | | | | |
|---|---|---|---|---|
| 2011/0149813 A1* | 6/2011 | Parkvall | ............... | H04B 7/2656 370/280 |
| 2013/0188516 A1* | 7/2013 | He | ..................... | H04W 28/16 370/254 |

OTHER PUBLICATIONS

Ericsson et al., "Signalling support for dynamic TDD", 3GPP TSG-RAN WG1 #72, R1-130558, Jan. 28,-Feb. 1, 2013, 3 pages.
Ericsson et al., "On standardization impact of TDD UL-DL adaptation", 3GPP TSG-RAN WG1 #69, R1-122016, May 21-25, 2012, pp. 1-3.
Samsung, "CRS interference in UL/DL flexible subframes", 3GPP TSG RAN WG1 #72, R1-130289, Jan. 28,-Feb. 1, 2013, pp. 1-3.

* cited by examiner

FIG. 9

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 11

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 12

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | | 6 | | | | | 6 | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 13

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | | 4 | | | 7, 6 | | 4 |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 14

| CONDITION | UPLINK REFERENCE CONFIGURATION | DOWNLINK REFERENCE CONFIGURATION |
|---|---|---|
| (a) | D | D |
| (b) | U | U OR D |
| (c) | S | S OR D |

FIG. 15

| CONDITION | UPLINK REFERENCE CONFIGURATION | DOWNLINK REFERENCE CONFIGURATION | TRANSMISSION DIRECTION CONFIGURATION |
|---|---|---|---|
| (d) | D | D | D |
| (e) | U | U | U |
| (f) | U | D | U OR D |
| (g) | S | S | S |
| (h) | S | D | S OR D |

FIG. 16

| UPLINK REFERENCE CONFIGURATION | DOWNLINK REFERENCE CONFIGURATION | TX DIRECTION CONFIGURATION |
|---|---|---|
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 2 | 1, 2 |
| 1 | 4 | 1, 4 |
| 1 | 5 | 1, 2, 4, 5 |
| 2 | 5 | 2, 5 |
| 3 | 4 | 3, 4 |
| 3 | 5 | 3, 4, 5 |
| 4 | 5 | 4, 5 |
| 5 | – | – |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK REFERENCE CONFIGURATION | DOWNLINK REFERENCE CONFIGURATION | TX DIRECTION CONFIGURATION |
|---|---|---|
| 0 | 1 | 0, 1, |
| 0 | 2 | 0, 2 |
| 0 | 3 | 0, 3 |
| 0 | 4 | 0, 4 |
| 0 | 5 | 0, 5 |
| 0 | 6 | 0, 6 |
| 1 | 2 | 1, 2 |
| 1 | 4 | 1, 4 |
| 1 | 5 | 1, 5 |
| 2 | 5 | 2, 5 |
| 3 | 4 | 3, 4 |
| 3 | 5 | 3, 5 |
| 4 | 5 | 4, 5 |
| 5 | - | - |
| 6 | 1 | 1, 6 |
| 6 | 2 | 2, 6 |
| 6 | 3 | 3, 6 |
| 6 | 4 | 4, 6 |
| 6 | 5 | 5, 6 |

BASE STATION APPARATUS, TERMINAL APPARATUS, INTEGRATED CIRCUIT, AND RADIO COMMUNICATION METHOD

TECHNICAL FIELD

The present invention relates to a base station apparatus, a terminal apparatus, an integrated circuit, and a radio communication method.

BACKGROUND ART

A radio access method and a radio network (hereinafter, referred to as Long-Term Evolution (LTE) or Evolved Universal Terrestrial Radio Access (EUTRA)) of cellular mobile communication have been examined in the Third Generation Partnership Project (3GPP). In LTE, an orthogonal frequency division multiplexing (OFDM) method is used as a downlink communication method. In LTE, a single-carrier frequency division multiple access (SC-FDMA) method is used as an uplink communication method. In LTE, a base station apparatus is also referred to as evolved NodeB (eNodeB), and a mobile station apparatus is also referred to as user equipment (UE). LTE is a cellular communication system in which a plurality of areas covered by a base station apparatus are allocated in a cell form. A single base station apparatus may manage a plurality of cells.

LTE corresponds to time division duplex (TDD). LTE employing the TDD is also referred to as TD-LTE or LTE TDD. The TDD is a technique which can realize full-duplex communication in a single frequency band through time division multiplexing of an uplink signal and a downlink signal.

In 3GPP, it has been examined that a traffic adaptation technique and an interference reduction technique (DL-UL interference management and traffic adaptation) in which a ratio of an uplink resource and a downlink resource is changed depending on uplink traffic and downlink traffic are applied to the TD-LTE.

In NPL 1, a method of using a flexible subframe is proposed as a method of realizing traffic adaptation. A base station apparatus can receive an uplink signal or transmit a downlink signal in a flexible subframe. In NPL 1, a mobile station apparatus regards the flexible subframe as a downlink subframe unless the mobile station apparatus is instructed to transmit an uplink signal in the flexible subframe by the base station apparatus. The traffic adaptation technique is also referred to as dynamic TDD.

NPL 1 discloses that a hybrid automatic repeat request (HARQ) timing for a physical downlink shared channel (PDSCH) is determined on the basis of an uplink-downlink configuration which is newly introduced, and that HARQ timing of a physical uplink shared channel (PUSCH) is determined on the basis of the initial UL-DL configuration.

NPL 2 discloses that (a) a UL/DL reference configuration is introduced, and (b) several subframes may be scheduled to be used for either an uplink or a downlink through dynamic grant/assignment from a scheduler.

CITATION LIST

Non Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21 to 25 May 2012.

NPL 2: "Signaling support for dynamic TDD", R1-130558, Ericsson, ST-Ericsson, 3GPP TSG-RAN WG1 Meeting #72, St Julian's, Malta, 28 Jan. to 1 Feb. 2013.

DISCLOSURE OF THE INVENTION

Problems to be Solved by the Invention

Throughput can be considerably improved in a case where the traffic adaptation technique is applied compared with a case where the ratio of an uplink resource and a downlink resource is not changed. However, in a case where a terminal apparatus erroneously receives/decodes scheduling information from a scheduler, there is a problem in that the terminal apparatus transmits an uplink signal in a subframe in which a base station apparatus transmits a downlink signal to another terminal apparatus, and thus the uplink signal interferes with the downlink signal.

The present invention has been made in consideration of the above circumstances, and an object thereof is to provide a base station apparatus, a terminal apparatus, an integrated circuit, and a radio communication method, capable of reducing the probability that the terminal apparatus may erroneously transmit an uplink signal.

Means for Solving the Problems (1) In order to achieve the object described above, the present invention apparatuses the following means. That is, a terminal apparatus according to the present invention includes: a configuration unit that sets a subframe for monitoring information indicating an uplink-downlink configuration; and a reception unit that monitors information indicating an uplink-downlink configuration available for the same radio frame, in each of a plurality of subframes, in which the reception unit monitors the information indicating an uplink-downlink configuration available for the same radio frame until a single piece of the information is detected, in each of a plurality of subframes in which the information indicating an uplink-downlink configuration available for the same radio frame is transmitted.

(2) An integrated circuit according to the present invention, that is implemented in a terminal apparatus that communicates with a base station apparatus, causing the terminal apparatus to exert a series of functions includes: a function of setting a subframe for monitoring information indicating an uplink-downlink configuration; and a function of monitoring information indicating an uplink-downlink configuration available for the same radio frame until a single piece of the information is detected, in each of a plurality of subframes in which the information indicating an uplink-downlink configuration available for the same radio frame is transmitted.

(3) A radio communication method according to the present invention, used in a terminal apparatus that communicates with a base station apparatus, includes: setting a subframe for monitoring information indicating an uplink-downlink configuration; and monitoring information indicating an uplink-downlink configuration available for the same radio frame until a single piece of the information is detected, in each of a plurality of subframes in which the information indicating an uplink-downlink configuration available for the same radio frame is transmitted.

(4) A base station apparatus according to the present invention, that communicates with a terminal apparatus, includes: a configuration unit that sets a subframe for monitoring information indicating an uplink-downlink configuration; and a transmission unit that transmits information indicating an uplink-downlink configuration available for the same radio frame, in each of a plurality of subframes, in which the plurality of subframes are included in a period of the same length as the length of a period of the same radio frame, the information indicating an uplink-downlink configuration available for the same radio frame being transmitted in the plurality of subframes.

(5) An integrated circuit according to the present invention, that is implemented in a base station apparatus that communicates with a terminal apparatus, causes the base station apparatus to exert a series of functions including: a function of setting a subframe for monitoring information indicating an uplink-downlink configuration; and a function of transmitting information indicating an uplink-downlink configuration available for the same radio frame, in each of a plurality of subframes, in which the plurality of subframes are included in a period of the same length as the length of a period of the same radio frame, the information indicating an uplink-downlink configuration available for the same radio frame being transmitted in the plurality of subframes.

(6) A radio communication method according to the present invention, used in a base station apparatus that communicates with a terminal apparatus, includes: setting a subframe for monitoring information indicating an uplink-downlink configuration; and transmitting information indicating an uplink-downlink configuration available for the same radio frame, in each of a plurality of subframes, in which the plurality of subframes are included in a period of the same length as the length of a period of the same radio frame, the information indicating an uplink-downlink configuration available for the same radio frame being transmitted in the plurality of subframes.

Advantageous Effects of Invention

According to the present invention, it is possible to reduce a probability that a terminal apparatus may erroneously transmit an uplink signal.

Effects of the Invention

According to the present invention, it is possible to reduce a probability that a terminal apparatus may erroneously transmit an uplink signal.

BRIEF DESCRIPTION OF THE DRAWINGS

FIG. 9 is a table illustrating an example of an uplink-downlink configuration in the present embodiment.

FIG. 10 is a diagram illustrating a correspondence between a subframe n in which PDCCH/EPDCCH/PHICH is allocated, and a subframe n+k in which a PUSCH corresponding to the PDCCH/EPDCCH/PHICH is allocated, in the present embodiment.

FIG. 11 is a diagram illustrating a correspondence between a subframe n in which a PHICH is allocated, and a subframe n−k in which a PUSCH corresponding to the PHICH is allocated, in the present embodiment.

FIG. 12 is a diagram illustrating a correspondence between a subframe n in which a PUSCH is allocated, and a subframe n+k in which a PHICH corresponding to the PUSCH is allocated, in the present embodiment.

FIG. 13 is a diagram illustrating a correspondence between a subframe n−k in which a PDSCH is allocated, and a subframe n in which a HARQ-ACK corresponding to the PDSCH is transmitted, in the present embodiment.

FIG. 14 is a diagram illustrating a relationship between a subframe indicated by an uplink reference configuration and a subframe indicated by a downlink reference configuration in a first embodiment of the present invention.

FIG. 15 is a diagram illustrating a relationship between a subframe indicated by an uplink reference configuration, a subframe indicated by a downlink reference configuration, and a subframe indicated by a transmission direction configuration, in the first embodiment of the present invention.

FIG. 16 is a diagram illustrating a relationship between an uplink reference configuration, a downlink reference configuration, and a transmission direction configuration, in the first embodiment of the present invention.

FIG. 18 is a diagram illustrating a relationship between an uplink reference configuration, a downlink reference configuration, and a transmission direction configuration, in a second embodiment of the present invention.

MODE FOR CARRYING OUT THE INVENTION

Hereinafter, embodiments of the present invention will be described.

In the present embodiment, a single cell is set for a mobile station apparatus. The present invention may be applied to each of a plurality of cells set for the mobile station apparatus. A technique in which the mobile station apparatus performs communication with the plurality of cells is referred to as cell aggregation or carrier aggregation. In addition, the present invention may be applied to some of the plurality of set cells. The cell set for the mobile station apparatus is also referred to as a serving cell.

A radio communication system of the present embodiment employs a time division duplex (TDD) method. In a case of cell aggregation, the TDD method may be applied to each of a plurality of cells.

In a case where a plurality of cells to which the TDD is applied are aggregated, a half-duplex TDD method or a full-duplex TDD method is applied thereto. In the half-duplex TDD method, a mobile station apparatus cannot simultaneously perform uplink transmission and downlink reception in the plurality of cells to which the TDD is applied. In the full-duplex TDD method, the mobile station apparatus can simultaneously perform uplink transmission and downlink reception in a plurality of cells to which the TDD is applied.

In a case where a cell to which the TDD is applied and a cell to which frequency division duplex (FDD) is applied are aggregated, the present invention is applicable to the cell to which the TDD is applied.

In the present embodiment, "X/Y" indicates "X or Y". In the present embodiment, "X/Y" indicates "X and Y". In the present embodiment, "X/Y" indicates "X and/or Y".

Figure 1:
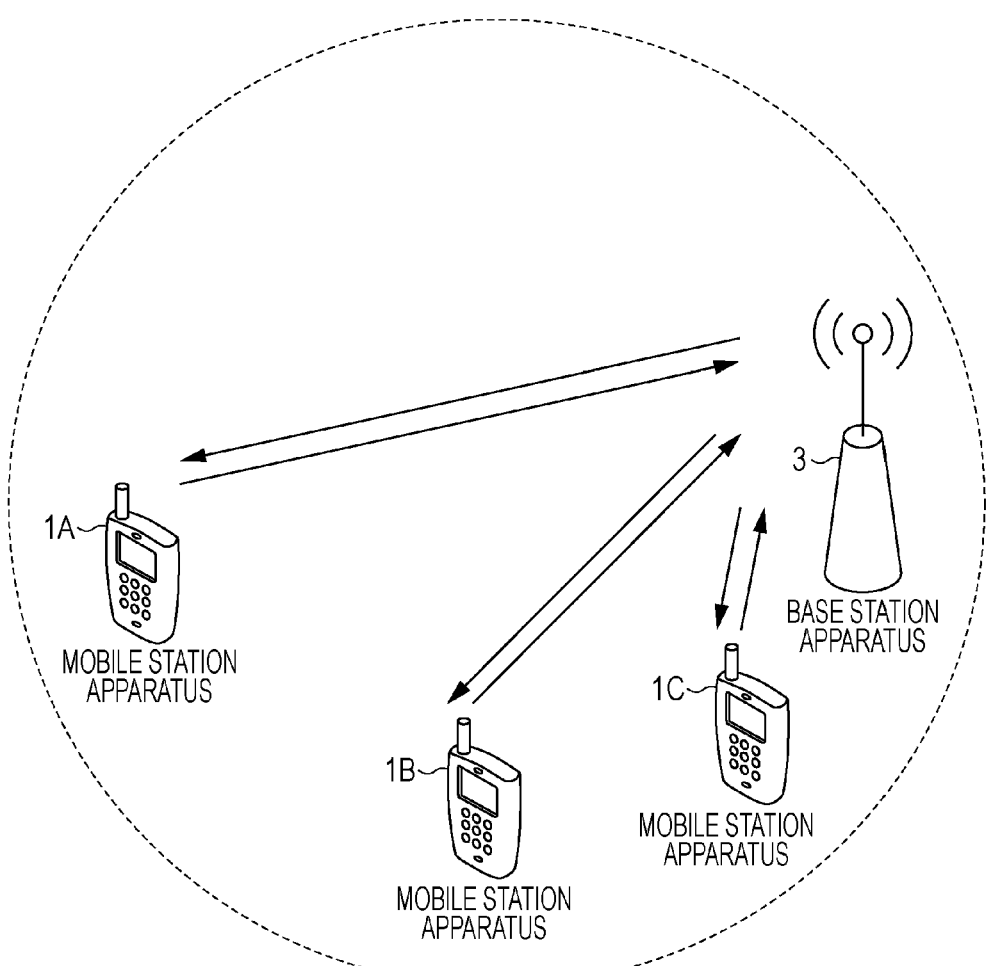
FIG. 1 is a conceptual diagram of a radio communication system of the present embodiment.

FIG. 1 is a conceptual diagram of a radio communication system of the present embodiment. In FIG. 1, the radio communication system includes mobile station apparatuses 1A to 1C, and a base station apparatus 3. Hereinafter, the mobile station apparatuses 1A to 1C are referred to a as "mobile station apparatus 1".

A physical channel and a physical signal of the present embodiment will be described.

In FIG. 1, the following uplink physical channels are used for uplink radio communication from the mobile station apparatus 1 to the base station apparatus 3. The uplink physical channels are used to transmit information which is output from a higher layer.

Physical uplink control channel (PUCCH)
Physical uplink shared channel (PUSCH)
Physical random access channel (PRACH)

The PUCCH is a physical channel used to transmit uplink control information (UCI). The uplink control information includes channel state information (CSI) of downlink, a scheduling request (SR) indicating a request for a PUSCH resource, and acknowledgement (ACK)/negative ACK (NACK) for downlink data (transport block, downlink-shared channel: DL-SCH). The ACK/NACK is also referred to as a HARQ-ACK, HARQ feedback, or response information.

The PUSCH is a physical channel used to transmit uplink data (uplink-shared channel: UL-SCH). In addition, the PUSCH may be used to transmit the ACK/NACK and/or the channel state information along with the uplink data. Further, the PUSCH may be used to transmit only the channel state information, or only the ACK/NACK and the channel state information.

The PRACH is a physical channel used to transmit a random access preamble. The PRACH is mainly used for the mobile station apparatus 1 to be synchronized with the base station apparatus 3 in a time domain. In addition, the PRACH is also used to indicate synchronization (timing adjustment) with an initial connection establishment procedure, a handover procedure, a connection reestablishment procedure, and uplink transmission, and to indicate a request for a PUSCH resource.

In FIG. 1, the following uplink physical signal is used for the uplink radio communication. The uplink physical signal is not used to transmit information output from a high layer but is used by a physical layer.

Uplink reference signal (UL RS)

In the present embodiment, the following two types of uplink reference signals are used.

Demodulation reference signal (DMRS)
Sounding reference signal (SRS)

The DMRS is related to transmission of the PUSCH or the PUCCH. The DMRS is subject to time division multiplexing with the PUSCH or the PUCCH. The base station apparatus 3 uses the DMRS to perform channel correction of the PUSCH or the PUCCH. Hereinafter, transmission of both the PUSCH and the DMRS is simply referred to transmission of the PUSCH. Hereinafter, transmission of both the PUCCH and the DMRS is simply referred to transmission of the PUCCH.

The SRS is not related to transmission of the PUSCH or the PUCCH. The base station apparatus 3 uses the SRS to measure an uplink channel state. The mobile station apparatus 1 transmits a first SRS in a first resource which is set by a high layer. In addition, in a case where information indicating a request for transmitting the SRS is received via a PDCCH, the mobile station apparatus 1 transmits a second SRS only once in a second resource which is set by the high layer. The first SRS is also referred to as a periodic SRS. The second SRS is also referred to as an aperiodic SRS.

In FIG. 1, the following downlink physical channels are used for downlink radio communication from the base station apparatus 3 to the mobile station apparatus 1. The downlink physical channels are used to transmit information output from a high layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)

The PBCH is used to send a notification of master information block (MIB, or broadcast channel: BCH) which is used in common by the mobile station apparatuses 1. The MIB is transmitted at intervals of 40 ms, and the MIB is repeatedly transmitted with periodicity of 10 ms. Specifically, initial transmission of the MIB is performed in a subframe 0 of a radio frame satisfying SFN mod 4=0, and retransmission (repetition) of the MIB is performed in subframes 0 of all other radio frames. The SFN (system frame number) is a radio frame number. The MIB is system information. For example, the MIB includes information indicating the SFN.

The PCFICH is used to transmit information indicating a region (OFDM symbol) which is used to transmit the PDCCH.

The PHICH is used to transmit a HARQ indicator (HARQ feedback or response information) indicating an acknowledgement (ACK) or negative acknowledgement (NACK) of uplink data (uplink shared channel: UL-SCH) received by the base station apparatus 3. For example, in a case where a HARQ indicator indicating an ACK is received, the mobile station apparatus 1 does not retransmit corresponding uplink data. For example, in a case where a HARQ indicator indicating a NACK is received, the mobile station apparatus 1 retransmits corresponding uplink data. A single PHICH transmits a HARQ indicator for a single item of uplink data. The base station apparatus 3 transmits respective HARQ indicators for a plurality of uplink data items included in the same PUSCH, by using a plurality of PHICHs.

The PDCCH and the EPDCCH are used to transmit downlink control information (DCI). The downlink control information is also referred to as a DCI format. The downlink control information includes a downlink grant (also referred to as downlink assignment) and an uplink grant. The downlink grant is downlink control information used for scheduling a single PDSCH in a single cell. The downlink grant is used for scheduling a PDSCH in the same subframe as a subframe in which the downlink grant is transmitted. The uplink grant is downlink control information used for scheduling a single PUSCH in a single cell. The uplink grant is used for scheduling a single PUSCH in a subframe which occurs four or more subframes later than a subframe in which the uplink grant is transmitted.

A cyclic redundancy check (CRC) parity bit is added to the DCI format. The CRC parity bit is scrambled with a cell-radio network temporary identifier (C-RNTI), or a semi-persistent scheduling cell-radio network temporary identifier (SPS C-RNTI). The C-RNTI and the SPS C-RNTI are identifiers for identifying a mobile station apparatus in a cell.

The C-RNTI is used to control the PDSCH or the PUSCH in a single subframe. The SPS C-RNTI is used to periodically allocate a PDSCH or PUSCH resource.

The PDSCH is used to transmit downlink data (downlink shared channel: DL-SCH).

In FIG. 1, the following downlink physical signals are used for the downlink radio communication. The downlink physical signals are not used to transmit information output from a high layer but are used by a physical layer.

Synchronization signal (SS)

Downlink reference signal (DL RS)

The synchronization signal is used for the mobile station apparatus 1 to perform synchronization of a frequency domain and a time domain of a downlink. The downlink reference signal is used for the mobile station apparatus 1 to perform channel correction of the downlink physical channel. The downlink reference signal is used for the mobile station apparatus 1 to calculate channel state information of a downlink. In the TDD method, the synchronization signal is mapped in subframes 0, 1, 5 and 6 of a radio frame. In the FDD method, the synchronization signal is mapped only in subframes 0 and 5 of a radio frame.

In the present embodiment, the following five types of downlink reference signals are used.

Cell-specific reference signal (CRS)

UE-specific reference signal (URS) related to a PDSCH

Demodulation reference signal (DMRS) related to an EPDCCH

Non-zero power channel state information—reference signal (NZP CSI-RS)

Zero power channel state information—reference signal (ZP CSI-RS)

The CRS is transmitted with every one of the subframes. The CRS is used to demodulate PBCH/PDCCH/PHICH/PCFICH/PDSCH. The CRS may be used for the mobile station apparatus 1 to calculate channel state information of a downlink. The PBCH/PDCCH/PHICH/PCFICH are (is) transmitted via an antenna port which is used to transmit the CRS.

The URS related to a PDSCH is transmitted with a subframe and a band which are used to transmit the PDSCH to which the URS is related. The URS is used to demodulate a PDSCH to which the URS is related.

The PDSCH is transmitted via an antenna port which is used to transmit a CRS or a URS. A DCI format 1A is used for scheduling a PDSCH which is transmitted via an antenna port used to transmit a CRS. A DCI format 2D is used for scheduling a PDSCH which is transmitted via an antenna port used to transmit a URS.

The DMRS related to an EPDCCH is transmitted with a subframe and a band which are used to transmit the EPDCCH to which the DMRS is related. The DMRS is used to demodulate an EPDCCH to which the DMRS is related. The EPDCCH is transmitted via an antenna port which is used to transmit the DMRS.

The NZP CSI-RS is transmitted in a set subframe. A resource in which the NZP CSI-RS is transmitted is set by the base station apparatus. The NZP CSI-RS is used for the mobile station apparatus 1 to calculate channel state information of downlink.

A resource of the ZP CSI-RS is set by the base station apparatus. The base station apparatus does not transmit the ZP CSI-RS. The base station apparatus does not transmit a PDSCH and an EPDCCH in a set resource of the ZP CSI-RS. For example, the mobile station apparatus can measure channel state information by using a CSI-RS in a certain cell which does not interfere with an adjacent cell, by setting a resource transmitted via the NZP CSI-RS in the certain cell as a resource transmitted via the ZP CSI-RS in the adjacent cell.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to a physical signal.

The BCH, UL-SCH and DL-SCH are transport channels. A channel used by a medium access control (MAC) layer is referred to as a transport channel. The unit of the transport channel used by the MAC layer is referred to as a transport block (TB) or a MAC protocol data unit (PDU). In the MAC layer, control of a hybrid automatic repeat request (HARQ) is performed on each transport block. The transport block is the unit of data which is delivered to a physical layer by the MAC layer. In the physical layer, the transport block is mapped to a codeword, and a coding process is performed on each codeword.

Hereinafter, a configuration of the radio frame of the present embodiment will be described.

Figure 2:
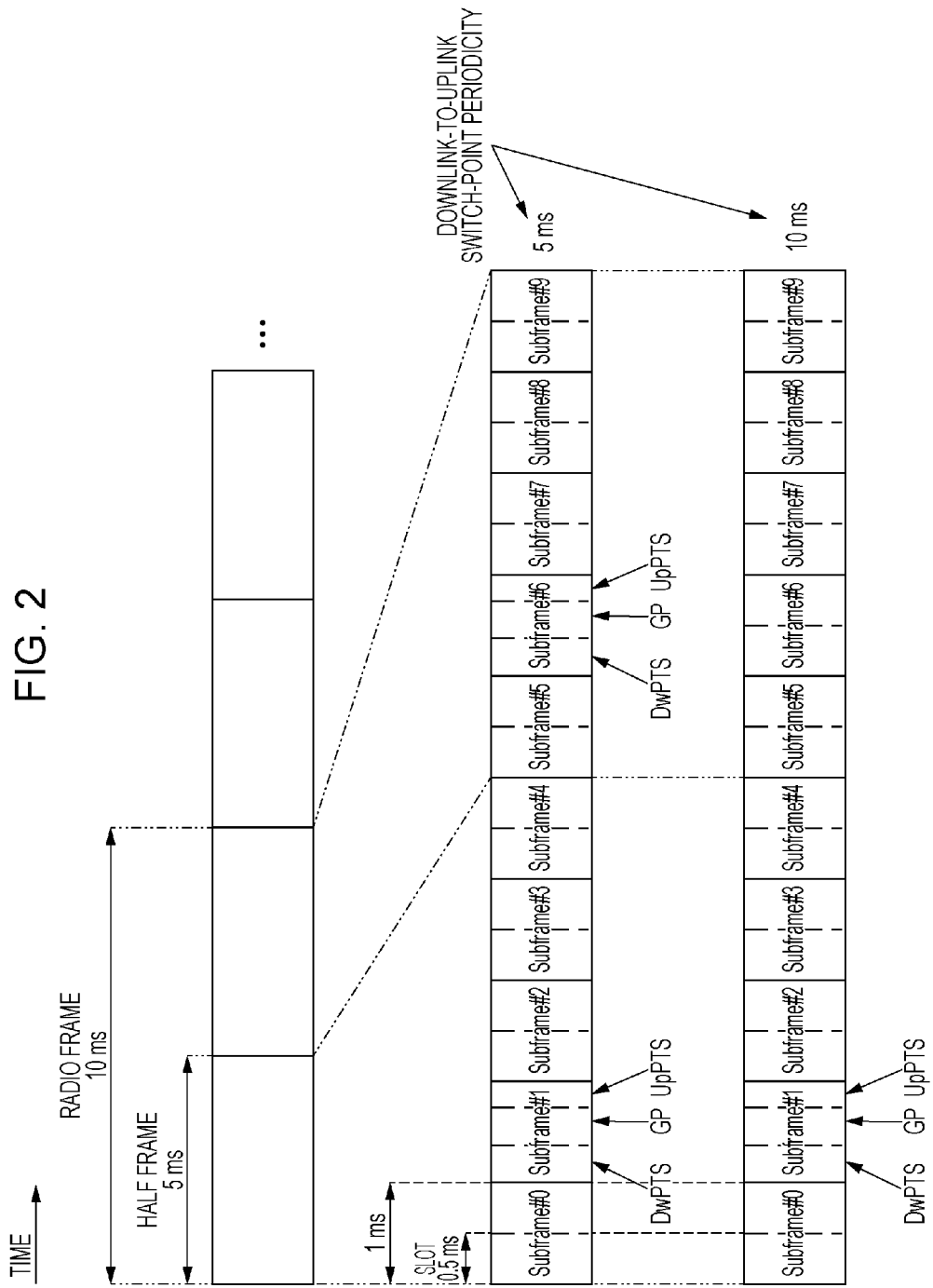
FIG. 2 is a diagram illustrating a schematic configuration of a radio frame of the present embodiment.

FIG. 2 is a diagram illustrating a schematic configuration of the radio frame of the present embodiment. Each radio frame has a length of 10 ms. In addition, each radio frame is constituted by two half frames. Each of the half frames has a length of 5 ms. Each of the half frames is constituted by five subframes. Each of the subframes has a length of 1 ms and is defined by two consecutive slots. Each of the slots has a length of 0.5 ms. An i-th subframe of the radio frame is constituted by a (2×i)-th slot and a (2×i+1)-th slot. In other words, ten subframes can be used at intervals of 10 ms.

In the present embodiment, the following three types of subframes are defined.

Downlink subframe (first subframe)

Uplink subframe (second subframe)

Special subframe (third subframe)

The downlink subframe is a subframe which is reserved for downlink transmission. The uplink subframe is a subframe which is reserved for uplink transmission. The special subframe is constituted by three fields. The three fields are a downlink pilot time slot (DwPTS), a guard period (GP), and an uplink pilot time slot (UpPTS). A total length of the DwPTS, the GP, and the UpPTS is 1 ms. The DwPTS is a field which is reserved for downlink transmission. The UpPTS is a field which is reserved for uplink transmission. The GP is a field in which downlink transmission and uplink transmission are not performed. In addition, the special subframe may consist of only the DwPTS and GP, and may consist of only the GP and the UpPTS.

A single radio frame is constituted by at least a downlink subframe, an uplink subframe, and a special subframe.

The radio communication system of the present embodiment supports the downlink-to-uplink switch-point periodicities of 5 ms and 10 ms. In a case where the downlink-to-uplink switch-point periodicity is 5 ms, a special subframe is included in both half frames of the radio frame. In a case where the downlink-to-uplink switch-point periodicity is 10 ms, a special subframe is included only in the first half frame of the radio frame.

Hereinafter, a configuration of the slot of the present embodiment will be described.

Figure 3:
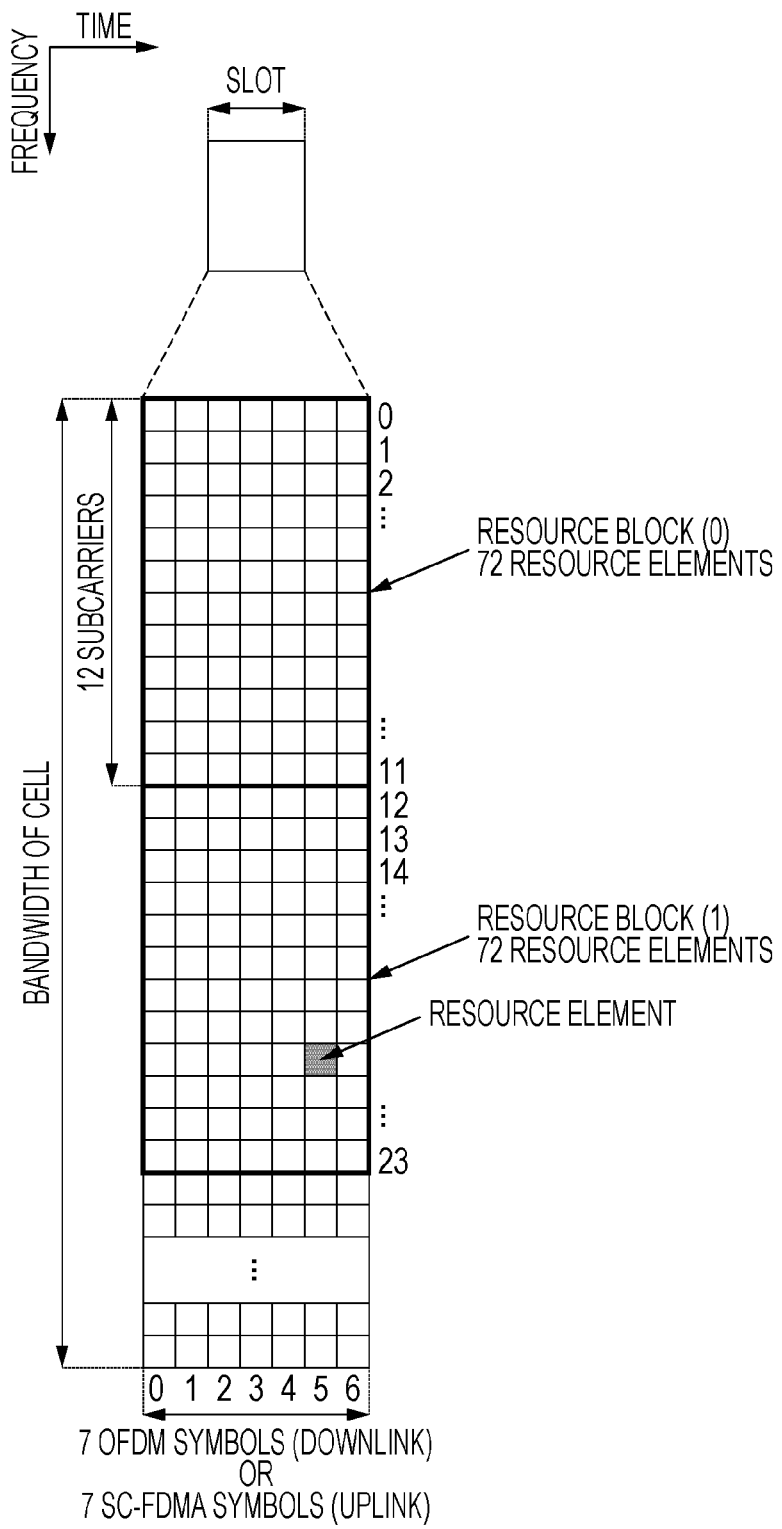
FIG. 3 is a diagram illustrating a configuration of a slot of the present embodiment.

FIG. 3 is a diagram illustrating a configuration of the slot of the present embodiment. A physical signal or a physical channel transmitted in each slot is expressed by a resource grid. In a downlink, the resource grid is defined by a plurality of subcarriers and a plurality of OFDM symbols. In an uplink, the resource grid is defined by a plurality of subcarriers and a plurality of SC-FDMA symbols. The number of subcarriers forming a single slot depends on a bandwidth of a cell. The number of OFDM symbols or SC-FDMA symbols forming a single slot is seven. Each of elements of the resource grid is referred to as a resource element. The resource element is identified by using a subcarrier number and an OFDM symbol number or an SC-FDMA symbol number.

A resource block is used to express mapping of a certain physical channel (a PDSCH, a PUSCH, or the like) to a resource element. The resource block includes a virtual resource block and a physical resource block. A certain physical channel is first mapped to the virtual resource block. Then, the virtual resource block is mapped to the physical resource block. A single physical resource block is defined by seven continuous OFDM symbols or SC-FDMA symbols in the time domain, and twelve contiguous subcarriers in the frequency domain. Therefore, a single physical resource block is constituted by (7×12) resource elements. In addition, a single physical resource block corresponds to a single slot in the time domain and corresponds to 180 kHz in the frequency domain. The physical resource block may be numbered from 0 in the frequency domain.

Hereinafter, a description will be made of a physical channel and a physical signal transmitted in each subframe.

Figure 4:
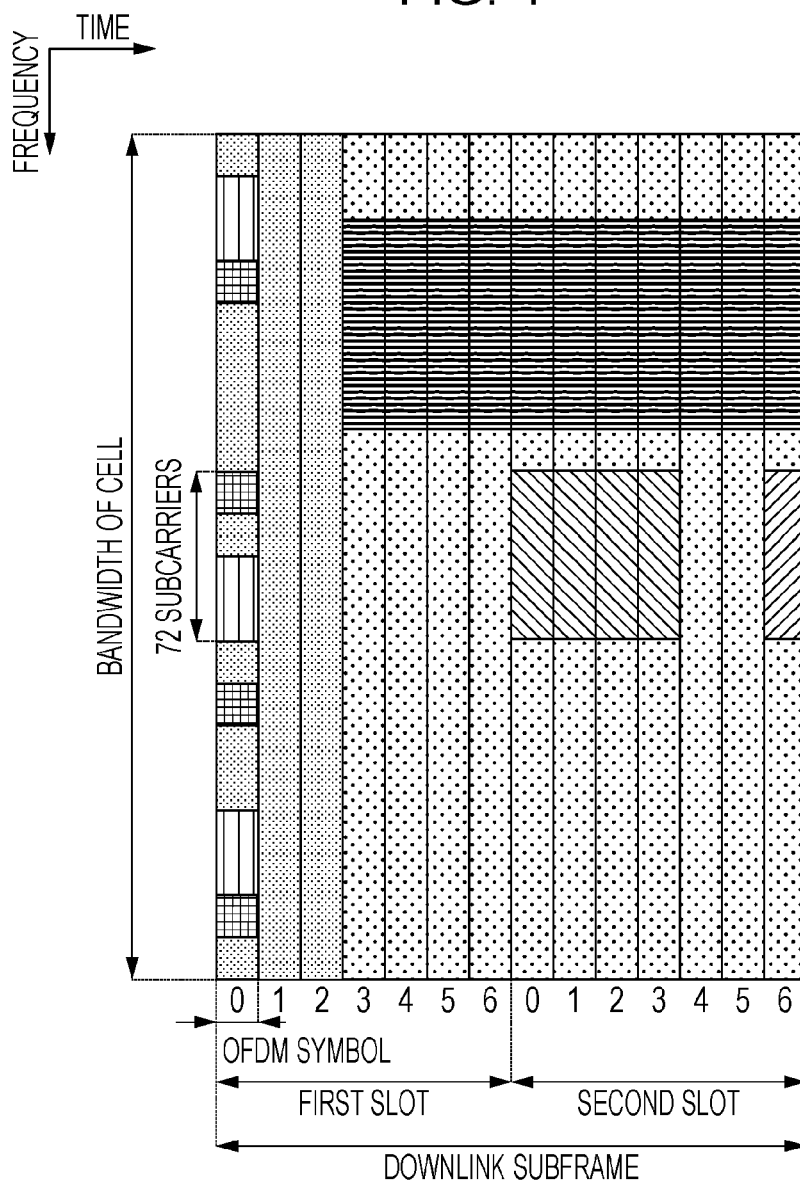
FIG. 4 is a diagram illustrating an example in which a physical channel and a physical signal are mapped in a downlink subframe of the present embodiment.

FIG. 4 is a diagram illustrating an example of an arrangement of physical channels and physical signals in a downlink subframe of the present embodiment. The base station apparatus 3 may transmit the downlink physical channels (the PBCH, the PCFICH, the PHICH, the PDCCH, the EPDCCH, and the PDSCH) and the downlink physical signals (the synchronization signal and the downlink reference signal) in the downlink subframe. In addition, the PBCH is transmitted only in the subframe 0 of the radio frame. Further, the downlink reference signal is mapped in resource elements which are distributed in the frequency domain and the time domain. For simplification of description, the downlink reference signal is not illustrated in FIG. 4.

In a PDCCH region, a plurality of PDCCHs may be subject to frequency and time multiplexing. In an EPDCCH region, a plurality of EPDCCHs may be subject to frequency and time multiplexing. In a PDSCH region, a plurality of PDSCHs may be subject to frequency and time multiplexing. The PDCCH and the PDSCH or the EPDCCH may be subject to time multiplexing. The PDSCH and the EPDCCH may be subject to frequency multiplexing.

Figure 5:
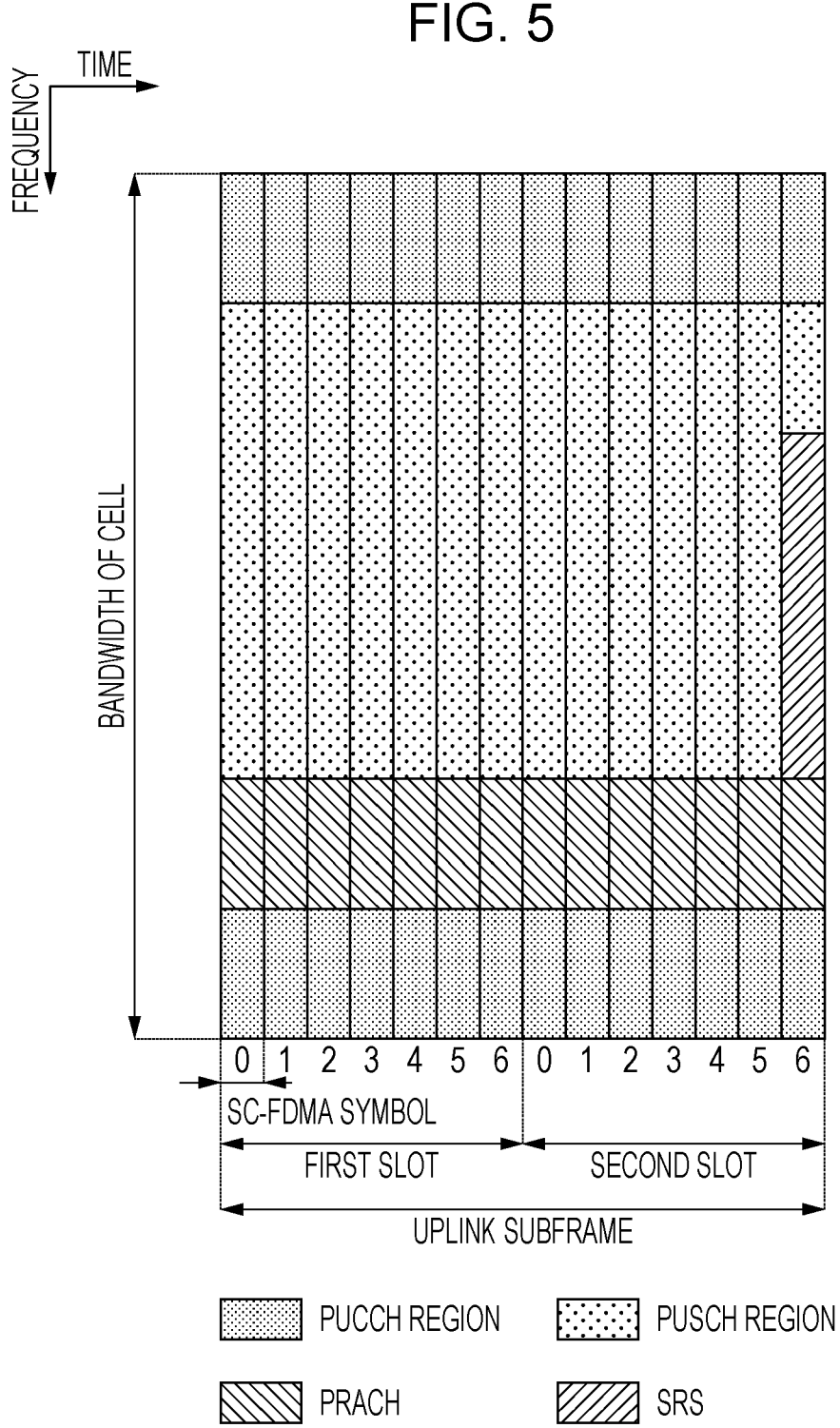
FIG. 5 is a diagram illustrating an example in which a physical channel and a physical signal are mapped in an uplink subframe of the present embodiment.

FIG. 5 is a diagram illustrating an example of an arrangement of physical channels and physical signals in an uplink subframe of the present embodiment. The mobile station apparatus 1 may transmit the uplink physical channels (the PUCCH, the PUSCH, and the PRACH) and the uplink physical signals (the DMRS and the SRS). In a PUCCH region, a plurality of PUCCHs may be subject to frequency, time and code multiplexing in the uplink subframe. In a PUSCH region, a plurality of PUSCHs may be subject to frequency and spatial multiplexing. The PUCCH and the PUSCH may be subject to frequency multiplexing. The PRACH may be allocated in a single subframe or across two subframes. In addition, a plurality of PRACHs may be subject to code multiplexing.

The SRS is transmitted by using the last SC-FDMA symbol of the uplink subframe. In other words, the SRS is mapped in the last SC-FDMA symbol of the uplink subframe. The mobile station apparatus 1 cannot simultaneously transmit the SRS and the PUCCH/PUSCH/PRACH in a single SC-FDMA symbol of a single cell. In a single uplink subframe of a single cell, the mobile station apparatus 1 can transmit the PUSCH and/or the PUCCH by using SC-FDMA symbols excluding the last SC-FDMA symbol of the uplink subframe, and can transmit the SRS by using the last SC-FDMA symbol of the uplink subframe. In other words, in the single uplink subframe of the single cell, the mobile station apparatus 1 can transmit both the SRS and the PUSCH/PUCCH. In addition, the DMRS is subject to time multiplexing with the PUCCH or the PUSCH. For simplification of description, the DMRS is not illustrated in FIG. 5.

Figure 6:
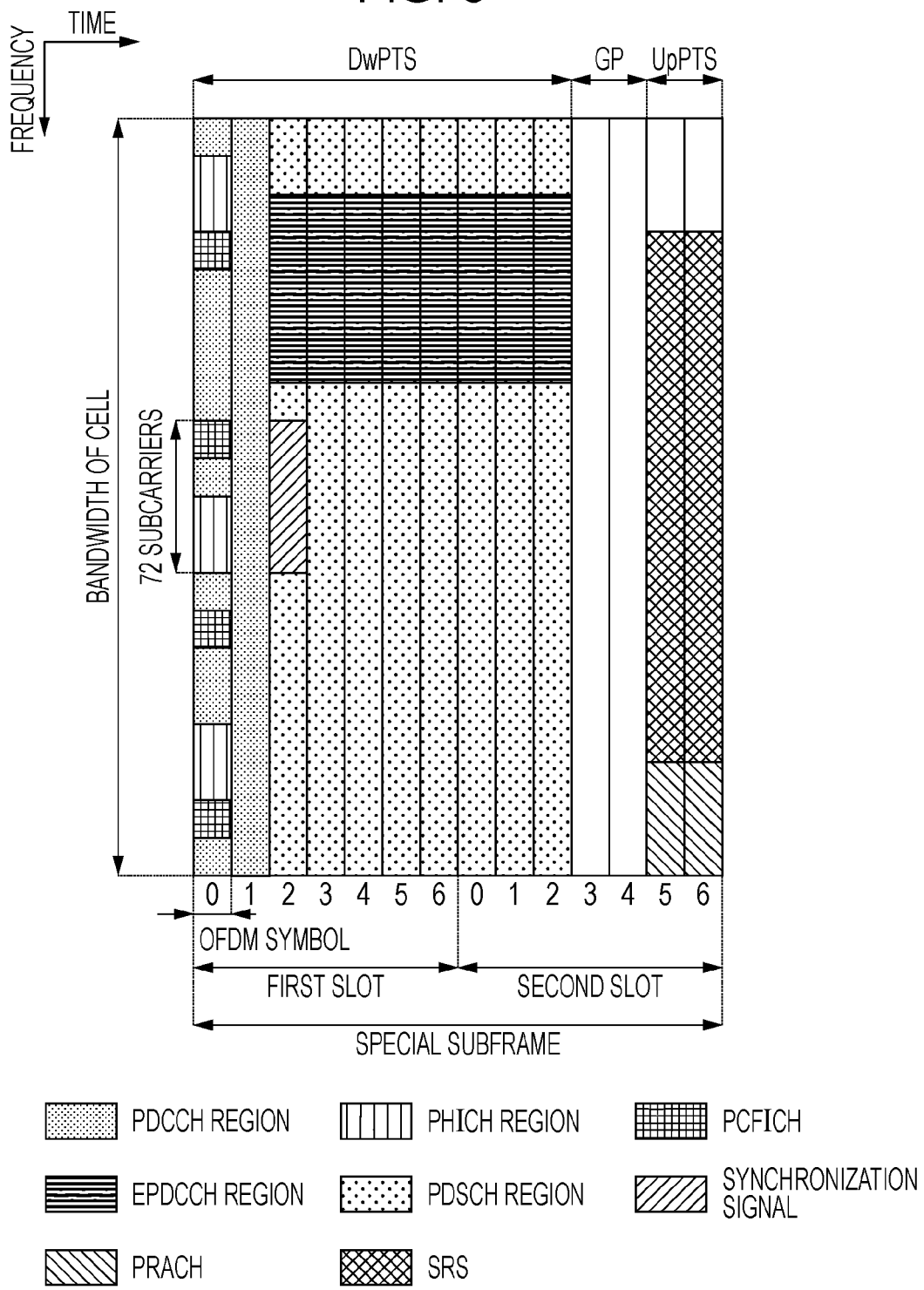
FIG. 6 is a diagram illustrating an example in which a physical channel and a physical signal are mapped in a special subframe of the present embodiment.

FIG. 6 is a diagram illustrating an example of an arrangement of physical channels and physical signals in a special subframe of the present embodiment. In FIG. 6, the DwPTs is constituted by the first to ninth SC-FDMA symbols of the special subframe, the GP is constituted by the tenth to twelfth SC-FDMA symbols of the special subframe, and the UpPTS is constituted by the thirteenth and fourteenth SC-FDMA symbols of the special subframe.

The base station apparatus 3 may transmit the PCFICH, the PHICH, the PDCCH, the EPDCCH, the PDSCH, the synchronization signal, and the downlink reference signal in the DwPTS of the special subframe. The base station apparatus 3 does not transmit the PBCH in the DwPTS of the special subframe. The mobile station apparatus 1 may transmit the PRACH and the SRS in the UpPTS of the special subframe. In other words, the mobile station apparatus 1 does not transmit the PUCCH, the PUSCH, and the DMRS in the UpPTS of the special subframe.

Hereinafter, a first embodiment of the present invention will be described.

Figure 7:
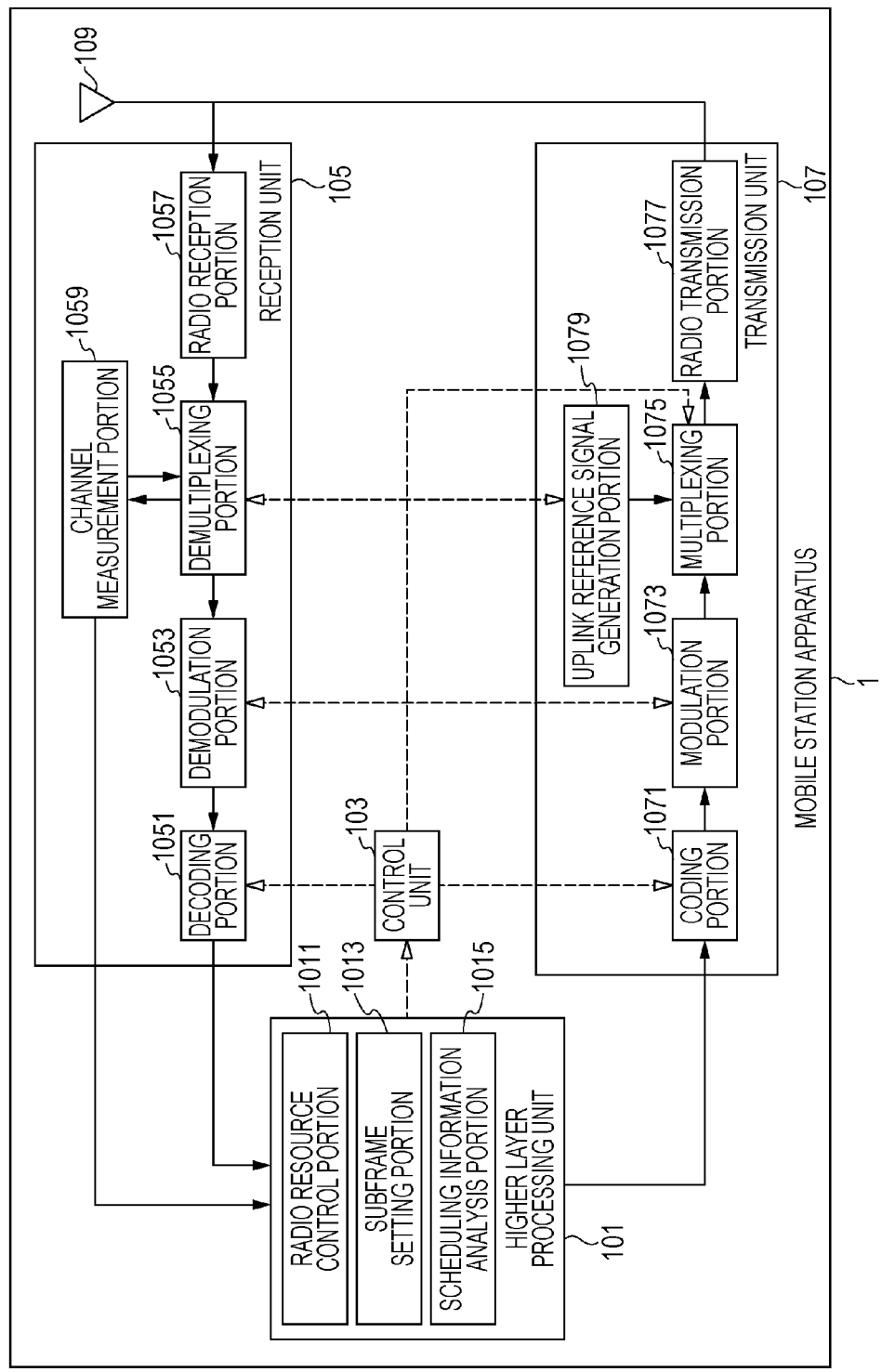
FIG. 7 is a schematic block diagram illustrating a configuration of a mobile station apparatus 1 of the present embodiment.

FIG. 7 is a schematic block diagram illustrating a configuration of the mobile station apparatus 1 according to the present embodiment. As illustrated in FIG. 7, the mobile station apparatus 1 includes a higher layer processing unit 101, a control unit 103, a reception unit 105, a transmission unit 107, and a transmit and receive antenna 109. In addition, the higher layer processing unit 101 includes a radio resource control portion 1011, a subframe setting portion 1013, and a scheduling information analysis portion 1015. Further, the reception unit 105 includes a decoding portion 1051, a demodulation portion 1053, a demultiplexing portion 1055, a radio reception portion 1057, and a channel measurement portion 1059. Furthermore, the transmission unit 107 includes a coding portion 1071, a modulation portion 1073, a multiplexing portion 1075, a radio transmission portion 1077, and an uplink reference signal generation portion 1079.

The higher layer processing unit 101 outputs uplink data (transport block) which is generated through a user's operation or the like, to the transmission unit 107. In addition, the higher layer processing unit 101 performs processes on a medium access control (MAC) layer, a packet data convergence protocol (PDCP) layer, a radio link control (RLC) layer, and a radio resource control (RRC) layer.

The radio resource control portion 1011 of the higher layer processing unit 101 manages various items of setting information of the terminal. In addition, the radio resource control portion 1011 generates information which is to be mapped in each channel of an uplink, and outputs the information to the transmission unit 107.

The subframe setting portion 1013 of the higher layer processing unit 101 manages an uplink reference configuration, a downlink reference configuration, and a transmission direction configuration. The subframe setting portion 1013 sets the uplink reference configuration according to first information which is received via the reception unit 105 and indicates the uplink reference configuration, sets the downlink reference configuration according to second information which is received via the reception unit 105 and indicates the downlink reference configuration, and sets the transmission direction configuration according to third information which is received via the reception unit 105 and indicates the transmission direction configuration. Hereinafter, the uplink reference configuration is also referred to as a first configuration, the downlink reference configuration is also referred to as a second configuration, and the transmission direction configuration is also referred to as a third configuration.

The scheduling information analysis portion 1015 of the higher layer processing unit 101 analyzes a DCI format (scheduling information) which is received via the reception unit 105, generates control information for controlling the reception unit 105 and the transmission unit 107 on the basis of a result of analyzing the DCI format, and outputs the control information to the control unit 103. The scheduling information analysis portion 1015 also determines timings for performing a transmission process and a reception process on the basis of the uplink reference configuration, and/or the downlink reference configuration, and/or the transmission direction configuration.

The control unit 103 generates control signals for controlling the reception unit 105 and the transmission unit 107 on the basis of the control information from the higher layer processing unit 101. The control unit 103 outputs the generated control signals to the reception unit 105 and the transmission unit 107 so as to control the reception unit 105 and the transmission unit 107.

The reception unit 105 demultiplexes, demodulates and decodes a received signal which is received from the base station apparatus 3 via the transmit and receive antenna 109, in response to the control signal which is input from the control unit 103, and outputs the decoded information to the higher layer processing unit 101.

The radio reception portion 1057 converts (down-converts) a downlink signal which is received via the transmit and receive antenna 109 into an intermediate frequency so as to remove unnecessary frequency components, controls an amplification level so that a signal level is appropriately maintained, orthogonally demodulates the received signal on the basis of an in-phase component and an orthogonal component thereof, and converts the orthogonally demodulated analog signal into a digital signal. The radio reception portion 1057 removes a portion corresponding to a guard interval (GI) from the converted digital signal, and performs fast Fourier transform (FFT) on the signal from which the guard interval is removed, so as to extract a signal of the frequency domain.

The demultiplexing portion 1055 demultiplexes the extracted signal into the PHICH, the PDCCH, the EPDCCH, the PDSCH, and the downlink reference signal. Further, the demultiplexing portion 1055 compensates for channels such as the PHICH, the PDCCH, the EPDCCH, and the PDSCH on the basis of channel estimation values which are input from the channel measurement portion 1059. Furthermore, the demultiplexing portion 1055 outputs the demultiplexed downlink reference signal to the channel measurement portion 1059.

The demodulation portion 1053 multiplies and combines the PHICH by and with a corresponding sign, demodulates the combined signal in a binary phase shift keying (BPSK) modulation method, and outputs an obtained signal to the decoding portion 1051. The decoding portion 1051 decodes the PHICH directed to the mobile station apparatus, and outputs a decoded HARQ indicator to the higher layer processing unit 101. The demodulation portion 1053 demodulates the PDCCH and/or the EPDCCH in a QPSK modulation method, and outputs an obtained result to the decoding portion 1051. In a case where the decoding portion 1051 tries to decode the PDCCH and/or the EPDCCH and succeeds in the decoding, and the decoding portion outputs decoded downlink control information and RNTI corresponding to the downlink control information to the higher layer processing unit 101.

The demodulation portion 1053 demodulates the PDSCH in a modulation method such as quadrature phase shift keying (QPSK), 16 quadrature amplitude modulation (QAM), or 64 QAM, of which a notification is sent in a downlink grant, and outputs an obtained result to the decoding portion 1051. The decoding portion 1051 performs decoding on the basis of information regarding a coding rate of which a notification has been sent with the downlink control information, and outputs decoded downlink data (transport block) to the higher layer processing unit 101.

The channel measurement portion 1059 measures a path loss of a downlink or a channel state on the basis of the downlink reference signal which is input from the demultiplexing portion 1055, and outputs the measured path loss or channel state to the higher layer processing unit 101. In addition, the channel measurement portion 1059 calculates a channel estimation value of the downlink on the basis of the downlink reference signal, and outputs the estimation value to the demultiplexing portion 1055.

The transmission unit 107 generates an uplink reference signal in response to the control signal which is input from the control unit 103, codes and modulates uplink data (transport block) which is input from the higher layer processing unit 101, multiplexes the PUCCH, the PUSCH, and the generated uplink reference signal, and transmits the obtained result to the base station apparatus 3 via the transmit and receive antenna 109.

The coding portion 1071 performs coding such as convolutional coding or block coding on the uplink control information which is input from the higher layer processing unit 101. In addition, the coding portion 1071 performs turbo coding on the basis of information used for scheduling the PUSCH.

The modulation portion 1073 modulates the coded bits which are input from the coding portion 1071 in a modulation method such as BPSK, QPSK, 16 QAM, or 64 QAM, of which a notification is sent with the downlink control information, or in a modulation method which is predefined for each channel. The modulation portion 1073 determines the number of data sequences which are spatially multiplexed on the basis of the information used for scheduling the PUSCH, maps a plurality of uplink data items which are transmitted in the same PUSCH to a plurality of sequences by using multiple input multiple output spatial multiplexing (MIMO SM), and performs precoding on the sequences.

The uplink reference signal generation portion 1079 generates sequences obtained according to a predefined rule (expression) on the basis of a physical cell identity (PCI; referred to as a cell ID or the like) for identifying the base station apparatus 3, a bandwidth in which the uplink reference signal is mapped, cyclic shift of which a notification has been sent in an uplink grant, values of parameters for generation of a DMRS sequence, and the like. In response to the control signal which is input from the control unit 103, the multiplexing portion 1075 arranges modulation symbols of the PUSCH in parallel, and performs discrete Fourier transform (DFT) thereon. In addition, the multiplexing portion 1075 multiplexes signals of the PUCCH and the PUSCH, and the generated uplink reference signal for each transmit antenna port. In other words, the multiplexing portion 1075 maps the signals of the PUCCH and the PUSCH and the generated uplink reference signal in resource elements for each transmit antenna port.

The radio transmission portion 1077 performs inverse fast Fourier transform (IFFT) on the multiplexed signal so as to perform modulation thereon in an SC-FDMA method; adds a guard interval to a SC-FDMA symbol which is SC-FDMA-modulated, so as to generate a digital signal with a base band; converts the digital signal with the base band into an analog signal; generates an in-phase component and an orthogonal component with an intermediate frequency from the analog signal; removes a remaining frequency component for an intermediate frequency band; converts (up-converts) the signal with the intermediate frequency into a signal with a radio frequency; removes a remaining frequency component therefrom; amplifies power of the signal; and outputs the signal to the transmit and receive antenna 109 so that the signal is transmitted.

Figure 8:
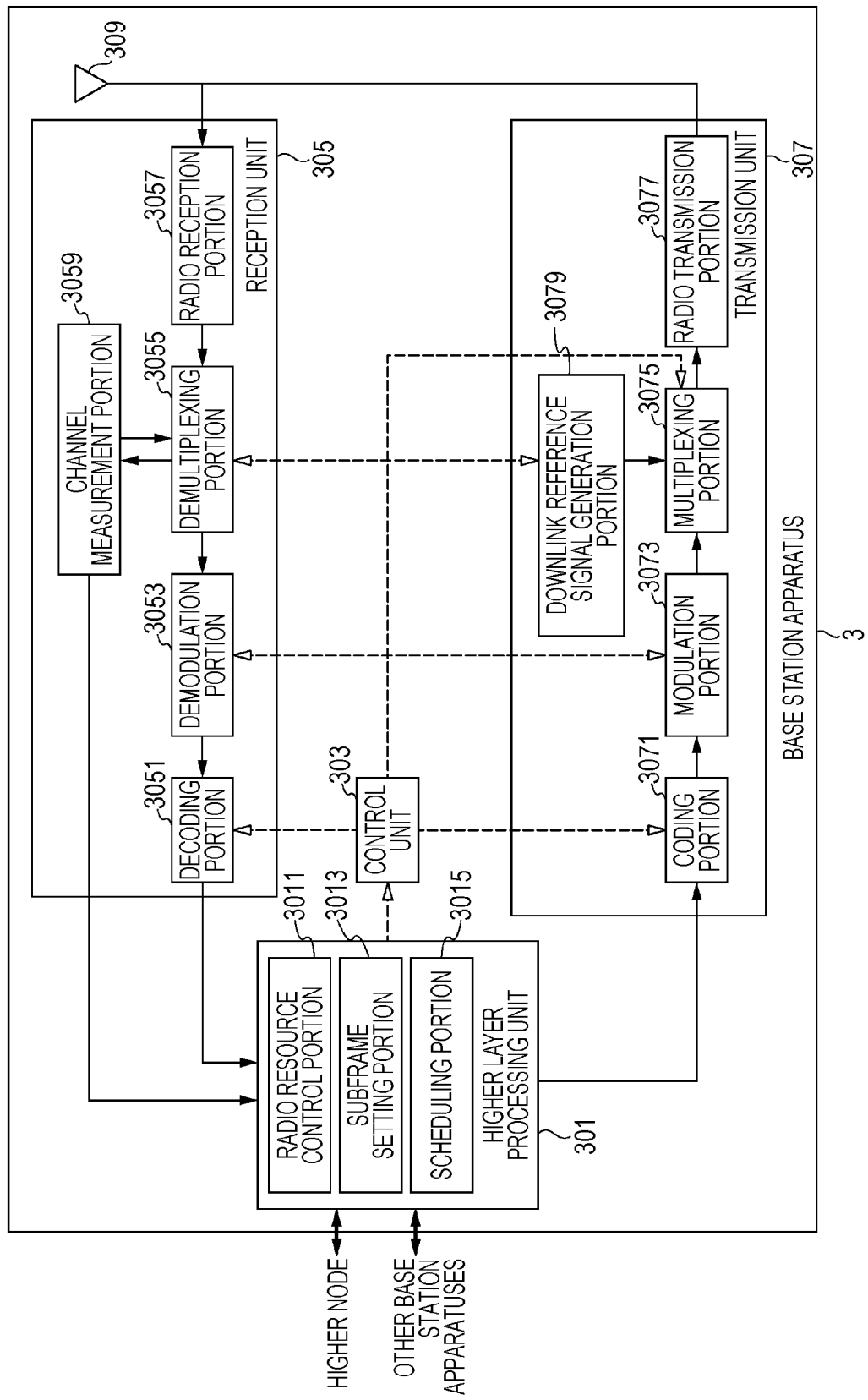
FIG. 8 is a schematic block diagram illustrating a configuration of a base station apparatus 3 of the present embodiment.

FIG. 8 is a schematic block diagram illustrating a configuration of the base station apparatus 3 of the present embodiment. As illustrated in FIG. 8, the base station apparatus 3 includes a higher layer processing unit 301, a control unit 303, a reception unit 305, a transmission unit 307, and a transmit and receive antenna 309. In addition, the higher layer processing unit 301 includes a radio resource control portion 3011, a subframe setting portion 3013, and a scheduling portion 3015. Further, the reception unit 305 includes a decoding portion 3051, a demodulation portion 3053, a demultiplexing portion 3055, a radio reception portion 3057, and a channel measurement portion 3059. Furthermore, the transmission unit 307 includes a coding portion 3071, a modulation portion 3073, a multiplexing portion 3075, a radio transmission portion 3077, and a downlink reference signal generation portion 3079.

The higher layer processing unit 301 performs processes on a medium access control (MAC) layer, a packet data convergence protocol (PDCP) layer, a radio link control (RLC) layer, and a radio resource control (RRC) layer. In addition, the higher layer processing unit 301 generates control information for controlling the reception unit 305 and the transmission unit 307 and transmits the control information to the control unit 303.

The radio resource control portion 3011 of the higher layer processing unit 301 generates downlink data (transport block) which will be mapped in the PDSCH of a downlink, system information, an RRC message, an MAC control element (CE), and the like, or acquires the information from a higher node, and outputs the information to the transmission unit 307. In addition, the radio resource control portion 3011 manages various items of configuration information of each of the mobile station apparatuses 1.

The subframe setting portion 3013 of the higher layer processing unit 301 performs, on each of the mobile station apparatuses 1, management of the uplink reference configuration, the downlink reference configuration, and the transmission direction configuration.

The subframe setting portion 3013 generates first information indicating the uplink reference configuration, second information indicating the downlink reference configuration, and third information indicating the transmission direction configuration. The subframe setting portion 3013 transmits the first information, the second information, and the third information to the mobile station apparatus 1 via the transmission unit 307.

The base station apparatus 3 may determine the uplink reference configuration, the downlink reference configuration, and/or the transmission direction configuration for the mobile station apparatus 1. In addition, the base station apparatus 3 may be given an instruction for the uplink reference configuration, the downlink reference configuration, and/or the transmission direction configuration, related to the mobile station apparatus 1, from a higher node.

For example, the subframe setting portion 3013 may determine the uplink reference configuration, the downlink reference configuration, and/or the transmission direction configuration on the basis of an uplink traffic amount and a downlink traffic amount.

The scheduling portion 3015 of the higher layer processing unit 301 determines a frequency and a subframe in which physical channels (the PDSCH and the PUSCH) are assigned, a coding rate of the physical channels (the PDSCH and the PUSCH), a modulation method, transmission power, and the like, on the basis of a channel estimation value, channel quality, or the like which is input from the channel measurement portion 3059. The scheduling portion 3015 determines whether a downlink physical channel and/or a downlink physical signal (are) is scheduled or an uplink physical channel and/or an uplink physical signal (are) is scheduled, in a flexible subframe. The scheduling portion 3015 generates control information (for example, a DCI format) for controlling the reception unit 305 and the transmission unit 307 on the basis of the scheduling result, and output the control information to the control unit 303.

The scheduling portion 3015 generates information used for scheduling the physical channels (the PDSCH and the PUSCH) on the basis of the scheduling result. The scheduling portion 3015 determines timings for performing a transmission process and a reception process on the basis of the uplink reference configuration, the downlink reference configuration, and/or the transmission direction configuration.

The control unit 303 generates control signals for controlling the reception unit 305 and the transmission unit 307 on the basis of the control information from the higher layer processing unit 301. The control unit 303 outputs the generated control signals to the reception unit 305 and the transmission unit 307 so as to control the reception unit 305 and the transmission unit 307.

The reception unit 305 demultiplexes, demodulates and decodes a received signal which is received from the mobile station apparatus 1 via the transmit and receive antenna 309, in response to the control signal which is input from the control unit 303, and outputs the decoded information to the higher layer processing unit 301. The radio reception portion 3057 converts (down-converts) an uplink signal which is received via the transmit and receive antenna 309 into an intermediate frequency so as to remove unnecessary frequency components, controls an amplification level so that a signal level is appropriately maintained, orthogonally demodulates the received signal on the basis of an in-phase component and an orthogonal component thereof, and converts the orthogonally demodulated analog signal into a digital signal.

The radio reception portion 3057 removes a portion corresponding to a guard interval (GI) from the converted digital signal. The radio reception portion 3057 performs fast Fourier transform (FFT) on the signal from which the guard interval is removed, so as to extract a signal of the frequency domain which is thus output to the demultiplexing portion 3055.

The demultiplexing portion 1055 demultiplexes the signal which is input from the radio reception portion 3057, into signals such as the PUCCH, the PUSCH, and the uplink reference signal. In addition, this demultiplexing is performed on the basis of radio resource assignment information which is determined in advance by the radio resource control portion 3011 and is included in an uplink grant of which the base station apparatus 3 notifies each mobile station apparatus 1. Further, the demultiplexing portion 3055 compensates channels such as the PUCCH and the PUSCH on the basis of channel estimation values which are input from the channel measurement portion 3059. Furthermore, the demultiplexing portion 3055 outputs the demultiplexed uplink reference signal to the channel measurement portion 3059.

The demodulation portion 3053 performs inverse discrete Fourier transform (IDFT) on the PUSCH so as to acquire modulation symbols, and performs demodulation of the received signal on each of modulation symbols of the PUCCH and the PUSCH, by using a modulation method which is predefined, such as binary phase shift keying (BPSK), quadrature phase shift keying (QPSK), 16 QAM, or 64 QAM, or a modulation method of which the base station apparatus 3 notifies the mobile station apparatus 1 in advance in an uplink grant. The demodulation portion 3053 demultiplexes modulation symbols of a plurality of uplink data items transmitted in the same PUSCH by using the MIMO SM on the basis of the number of spatially multiplexed sequences of which a notification is sent to each mobile station apparatus 1 in advance in the uplink grant and information for giving an instruction for precoding which will be performed on the sequences.

The decoding portion 3051 decodes coded bits of the demodulated PUCCH and PUSCH at a coding rate which is predefined in a predefined coding method or of which the base station apparatus 3 notifies the mobile station apparatus 1 in the uplink grant in advance, and outputs decoded uplink data and uplink control information to the higher layer processing unit 101. In a case where the PUSCH is retransmitted, the decoding portion 3051 performs decoding by using coded bits which are input from the higher layer processing unit 301 and are stored in a HARQ buffer and the demodulated coded bits. The channel measurement portion 309 measures channel estimation values, quality of the channels, and the like on the basis of the uplink reference signal which is input from the demultiplexing portion 3055, and outputs the measured results to the demultiplexing portion 3055 and the higher layer processing unit 301.

The transmission unit 307 generates a downlink reference signal in response to the control signal which is input from the control unit 303, codes and modulates the HARQ indicator, the downlink control signal, and the downlink data which are input from the higher layer processing unit 301, multiplexes the PHICH, the PDCCH, the EPDCCH, the PDSCH, and the downlink reference signal, and transmits a signal to the mobile station apparatus 1 via the transmit and receive antenna 309.

The coding portion 3071 performs coding on the HARQ indicator, the downlink control information, and the downlink data which are input from the higher layer processing unit 301, by using a predefined coding method such as block coding, convolutional coding, or turbo coding, or by using a coding method determined by the radio resource control portion 3011. The modulation portion 3073 modulates the coded bits which are input from the coding portion 3071 by using a predefined modulation method such as BPSK, QPSK, 16 QAM, or 64 QAM, or by using a modulation method determined by the radio resource control portion 3011.

The downlink reference signal generation portion 3079 generates sequences which are obtained in a predefined rule and are known to the mobile station apparatus 1, as the downlink reference signal, on the basis of a physical cell identity (PCI) or the like for identifying the base station apparatus 3. The multiplexing portion 3075 multiplexes the modulation symbol of each modulated channel and the generated downlink reference signal. In other words, the multiplexing portion 3075 maps the modulation symbol of each modulated channel and the generated downlink reference signal in resource elements.

The radio transmission portion 3077 performs inverse fast Fourier transform (IFFT) on the multiplexed modulation symbol so as to perform modulation thereon in an OFDM method; adds a guard interval to an OFDM symbol which is OFDM-modulated, so as to generate a digital signal with a base band; converts the digital signal with the base band into an analog signal; generates an in-phase component and an orthogonal component with an intermediate frequency from the analog signal; removes a remaining frequency component for an intermediate frequency band; converts (up-converts) the signal with the intermediate frequency into a signal with a radio frequency (RF); removes a remaining frequency component therefrom; amplifies power of the signal; and outputs the signal to the transmit and receive antenna 309 so that the signal is transmitted.

The downlink reference configuration, the uplink reference configuration, and the transmission direction configuration are defined by an uplink-downlink configuration (UL-DL configuration). The uplink-downlink configuration is a configuration related to a pattern of subframes of a radio frame. In other words, the downlink reference configuration, the uplink reference configuration, and the transmission direction configuration are defined by patterns of the downlink subframe, the uplink subframe, and the special subframe of the radio frame.

The uplink reference configuration is also referred to as an uplink reference uplink-downlink configuration (uplink reference UL-DL configuration) or a first parameter. The downlink reference configuration is also referred to as a downlink reference uplink-downlink configuration (downlink reference UL-DL configuration) or a second parameter. The transmission direction configuration is also referred to as a transmission direction uplink-downlink configuration (transmission direction UL-DL configuration) or a third parameter.

FIG. 9 is a table illustrating an example of an uplink-downlink configuration in the present embodiment. In FIG. 9, D indicates a downlink subframe, U indicates an uplink subframe, and S indicates a special subframe.

In FIG. 9, a subframe 1 of the radio frame is a special subframe at all times. In FIG. 9, subframes 0 to 5 are reserved for downlink transmission at all times, and the subframe 1 is reserved for uplink transmission at all times.

In FIG. 9, in a case where the downlink-to-uplink switch-point periodicity is 5 ms, a subframe 6 of the radio frame is a special subframe. In a case where the downlink-to-uplink switch-point periodicity is 10 ms, the subframe 6 of the radio frame is a downlink subframe.

An uplink-downlink configuration i being set as the uplink reference configuration is referred to as an uplink reference configuration i being set. An uplink-downlink configuration i being set as the downlink reference configuration is referred to as a downlink reference configuration i being set. An uplink-downlink configuration i being set as the transmission direction configuration is referred to as a transmission direction configuration i being set.

The base station apparatus 3 may transmit first information (TDD-Config) indicating the uplink reference configuration, second information indicating the downlink reference configuration, and third information indicating the transmission direction configuration, which include at least one of an MIB, a system information block type 1 message, a system information message, an RRC message, an MAC control element (CE), and control information (for example, a DCI format) of a physical layer. In addition, the base station apparatus 3 may include the first information, the second information, and the third information in at least one of the MIB, the system information block type 1 message, the system information message, the RRC message, the MAC control element (CE), and the control information (for example, a DCI format) of a physical layer, depending on circumstances.

The mobile station apparatus 1 receives the first information, the second information, and the third information. The mobile station apparatus 1 sets an uplink-downlink configuration indicated by the received first information as an uplink reference configuration. The mobile station apparatus 1 sets an uplink-downlink configuration indicated by the received second information as a downlink reference configuration. The mobile station apparatus 1 sets an uplink-downlink configuration indicated by the received third information as a transmission direction configuration. The first information is also referred to as a first parameter. The second information is also referred to as a second parameter. The third information is also referred to as a third parameter.

In addition, the mobile station apparatus 1 for which two cells are set may receive the first information for a certain cell and the first information for the other cell. Further, the mobile station apparatus 1 for which two cells may determine an uplink reference configuration for a certain cell on the basis of an uplink-downlink configuration is indicated by the first information for the certain cell and an uplink-downlink configuration indicated by the first information for the other cell.

Still further, the mobile station apparatus 1 for which two cells are set may determine a downlink reference configuration for a certain cell on the basis of an uplink-downlink configuration indicated by the second information for the certain cell and an uplink-downlink configuration indicated by the second information for the other cell.

Furthermore, the mobile station apparatus 1 for which two cells are set may determine a downlink reference configuration for a certain cell on the basis of an uplink-downlink configuration indicated by the first information for the certain cell and an uplink-downlink configuration indicated by the second information for the other cell.

Moreover, the mobile station apparatus 1 for which two cells are set may determine a downlink reference configuration for a certain cell on the basis of an uplink-downlink configuration indicated by the second information for the certain cell and an uplink-downlink configuration indicated by the first information for the other cell.

The first information indicating an uplink reference configuration is preferably included in the system information block type 1 message. The second information indicating a downlink reference configuration is preferably included in the system information block type 1 message, the system information message, or the RRC message. The third information indicating a transmission direction configuration is preferably included in the MIB, the MAC CE, or the control information (for example, a DCI format) of a physical layer.

The first information indicating an uplink reference configuration is preferably common to a plurality of mobile station apparatuses 1 in a cell. The second information indicating a downlink reference configuration may be common to the plurality of mobile station apparatuses 1 in the cell, and may be dedicated to the mobile station apparatus 1. The third information may be common to the plurality of mobile station apparatuses 1 in the cell, and may be dedicated to the mobile station apparatus 1.

The second information indicating a downlink reference configuration may be transmitted along with the first information indicating an uplink reference configuration. The mobile station apparatus 1 in which a downlink reference configuration is not set may not receive the third information indicating a transmission direction configuration.

The periodicity of changing the transmission direction configuration is preferably shorter than the periodicity of changing the downlink reference configuration. A frequency of changing the transmission direction configuration is preferably lower than a frequency of changing the downlink reference configuration. The periodicity of changing the downlink reference configuration is preferably shorter than the periodicity of changing the uplink reference configuration. A frequency of changing the downlink reference configuration is preferably lower than a frequency of changing the uplink reference configuration.

The system information block type 1 message is transmitted in the subframe 5 of the radio frame satisfying SFN mod 2=0, via a PDSCH. The system information block type 1 message includes information indicating a configuration (lengths of a DwPTS, a GP, and a UpPTS) of a special subframe. The system information block type 1 message is cell-specific information.

The system information message is transmitted via the PDSCH. The system information message is cell-specific information. The system information message includes system information blocks other than the system information block type 1 message.

The RRC message is transmitted via the PDSCH. The RRC message is information/signal which is processed in an RRC layer. The RRC message may be dedicated to a specified mobile station apparatus 1.

The MAC CE is transmitted via the PDSCH. The MAC CE is information/signal which is processed in an MAC layer.

In a case where an RRC message including the first information/the second information, and/or the third information are (is) received via the PDSCH, the mobile station apparatus 1 preferably sets (makes valid) the uplink reference configuration/the downlink reference configuration, and/or the transmission direction configuration in a subframe (timing) in which an "RRC connection reconfiguration completion message" corresponding to the RRC message is transmitted.

In a case where an MIB including the first information/the second information, and/or the third information is received via a PBCH in a subframe n−k, the mobile station apparatus 1 preferably sets (makes valid) the uplink reference configuration/the downlink reference configuration, and/or the transmission direction configuration in a subframe n. For example, k is 4. For example, k is determined on the basis of a table of FIG. 13 and the uplink-downlink configuration/the downlink reference configuration. FIG. 13 will be described later.

In a case where an MAC CE including the first information/the second information, and/or the third information is received via a PDSCH in a subframe n−k, the mobile station apparatus 1 preferably sets (makes valid) the uplink reference configuration/the downlink reference configuration, and/or the transmission direction configuration in a subframe n+k. For example, k is 4. For example, a subframe n+k is a subframe for transmitting a HARQ-ACK (ACK) of the PDSCH which is used to transmit the MAC CE. For example, k is determined on the basis of the table of FIG. 13 and the uplink reference configuration/the downlink reference configuration.

In a case where control information (for example, a DCI format) of a physical layer including the first information/the second information, and/or the third information is received via a downlink physical channel (for example, a PDCCH/EPDCCH) in a subframe n−k, the mobile station apparatus 1 preferably sets (makes valid) the uplink reference configuration/the downlink reference configuration, and/or the transmission direction configuration in a subframe n. For example, k is 4. For example, a subframe n+k is a subframe for transmitting a HARQ-ACK (ACK) of the downlink physical channel (for example, a PDCCH/EPDCCH) which is used to transmit the control information (for example, a DCI format) of the physical layer. For example, k is determined on the basis of the table of FIG. 13 and the uplink reference configuration/the downlink reference configuration.

Hereinafter, unless otherwise described, the mobile station apparatus 1 in which the uplink reference configuration, the downlink reference configuration, and the transmission direction configuration are set is referred to as a mobile station apparatus 1.

Hereinafter, the uplink reference configuration will be described in detail.

The uplink reference configuration is used to specify (select, determine) a correspondence between a subframe n in which the PDCCH/EPDCCH/PHICH is allocated and a subframe n+k in which the PUSCH corresponding to the PDCCH/EPDCCH/PHICH is allocated.

FIG. 10 is a diagram illustrating a correspondence between the subframe n in which the PDCCH/EPDCCH/PHICH is allocated and the subframe n+k in which the PUSCH corresponding to the PDCCH/EPDCCH/PHICH is allocated in the present embodiment. The mobile station apparatus 1 specifies (selects, determines) a value of k on the basis of a table of FIG. 10.

In a case where the mobile station apparatus 1 in which uplink reference configurations 1 to 6 are set detects the PDCCH/EPDCCH which includes an uplink grant intended for the mobile station apparatus 1 in the subframe n, the PUSCH corresponding to the uplink grant is transmitted in the subframe n+k which is specified (selected, determined) on the basis of the table of FIG. 10.

In a case where the mobile station apparatus 1 in which the uplink reference configurations 1 to 6 are set detects the PHICH intended for the mobile station apparatus 1 in the subframe n, the PUSCH corresponding to the PHICH is transmitted in the subframe n+k which is specified (selected, determined) on the basis of the table of FIG. 10.

An uplink grant intended for the mobile station apparatus 1 in which the uplink reference configuration 0 is set includes a 2-bit uplink index (UL index). An uplink grant intended for the mobile station apparatus 1 in which the uplink reference configurations 1 to 6 are set does not include the uplink index (UL index).

In a case where 1 is set to a most significant bit (MSB) of an uplink index included in the uplink grant in the subframe n, the mobile station apparatus 1 in which the uplink reference configuration 0 is set adjusts transmission of the PUSCH corresponding to the uplink grant in the subframe n+k which is specified (selected, determined) on the basis of the table of FIG. 10.

In a case where the mobile station apparatus 1 in which the uplink reference configuration 0 is set receives a PHICH in a first resource set of the subframe n=0 or 5, the mobile station apparatus adjusts transmission of the PUSCH corresponding to the PHICH in the subframe n+k which is specified (selected, determined) on the basis of the table of FIG. 10.

In a case where 1 is set to a least significant bit (LSB) of an uplink index included in the uplink grant in the subframe n, the mobile station apparatus 1 in which the uplink reference configuration 0 is set adjusts transmission of the PUSCH corresponding to the uplink grant in the subframe n+7.

In a case where the mobile station apparatus 1 in which the uplink reference configuration 0 is set receives a PHICH in a second resource set of the subframe n=0 or 5, or receives the PHICH in the subframe n=1 or 6, the mobile station apparatus adjusts transmission of the PUSCH corresponding to the uplink grant in the subframe n+7.

In a case where the mobile station apparatus 1 in which the uplink reference configuration 1 is set detects PDCCH/EPDCCH/PHICH in [SFN=m, subframe 1], the mobile station apparatus adjusts transmission of the PUSCH in [SFN=m, subframe 7] which is six subframes later than the subframe 1.

The uplink reference configuration is used to specify (select, determine) a correspondence between the subframe n in which the PHICH is allocated and the subframe n−k in which the PUSCH corresponding to the PHICH is allocated.

FIG. 11 is a diagram illustrating a correspondence between the subframe n in which the PHICH is allocated and the subframe n−k in which the PUSCH corresponding to the PHICH is allocated in the present embodiment. The mobile station apparatus 1 specifies (selects, determines) a value of k on the basis of a table of FIG. 11.

In a case where the uplink-downlink configurations 1 to 6 are set in the mobile station apparatus 1, a HARQ indicator (HARQ-ACK) which is received via a PHICH assigned to the mobile station apparatus 1 in the subframe n is related to transmission of a PUSCH in the subframe n−k which is specified on the basis of the table of FIG. 11.

In a case where the uplink reference configuration 0 is set in the mobile station apparatus 1, a HARQ indicator (HARQ-ACK) which is received via a PHICH assigned to the mobile station apparatus 1 in a first resource set of the subframe n=0 or 5, or in the subframes n=1 or 6, is related to transmission of a PUSCH in the subframe n−k which is specified on the basis of the table of FIG. 11.

In a case where the uplink reference configuration 0 is set in the mobile station apparatus 1, a HARQ indicator (HARQ-ACK) which is received via a PHICH assigned to the mobile station apparatus 1 in a second resource set of the subframe n=0 or 5 is related to the transmission of a PUSCH in the subframe n−6.

For example, regarding the mobile station apparatus 1 in which the uplink reference configuration 1 is set, a HARQ indicator (HARQ-ACK) which is received via the PHICH in [SFN=m, subframe 1] is related to transmission of the PUSCH in [SFN=m−1, subframe 7] which is four subframes earlier than the subframe 1.

The uplink reference configuration is used to specify (select, determine) a correspondence between the subframe n in which a PUSCH is allocated and the subframe n+k in which a PHICH corresponding to the PUSCH is allocated.

FIG. 12 is a diagram illustrating a correspondence between the subframe n in which the PUSCH is allocated and the subframe n+k in which the PHICH corresponding to the PUSCH is allocated in the present embodiment. The mobile station apparatus 1 specifies (selects, determines) a value of k on the basis of a table of FIG. 12.

In a case where transmission of the PUSCH is scheduled in the subframe n, the mobile station apparatus 1 determines a PHICH resource in the subframe n+k which is specified on the basis of the table of FIG. 12.

For example, regarding the mobile station apparatus 1 in which the uplink reference configuration 0 is set, in a case where transmission of the PUSCH is scheduled in [SFN=m, subframe n=2], a PHICH resource is determined in [SFN=m, subframe n=6].

For example, regarding the mobile station apparatus 1 in which the uplink reference configuration 0 is set, in a case where transmission of the PUSCH is scheduled in [SFN=m, subframe n=3], a PHICH resource is determined from a first resource set in [SFN=m+1, subframe n=0].

For example, regarding the mobile station apparatus 1 in which the uplink reference configuration 0 is set, in a case where transmission of the PUSCH is scheduled in [SFN=m, subframe n=4], a PHICH resource is determined from a second resource set in [SFN=m+1, subframe n=0].

For example, regarding the mobile station apparatus 1 in which the uplink reference configuration 0 is set, in a case where transmission of the PUSCH is scheduled in [SFN=m, subframe n=7], a PHICH resource is determined in [SFN=m+1, subframe n=1].

For example, regarding the mobile station apparatus 1 in which the uplink reference configuration 0 is set, in a case where transmission of the PUSCH is scheduled in [SFN=m, subframe n=8], a PHICH resource is determined from a first resource set in [SFN=m+1, subframe n=5].

For example, regarding the mobile station apparatus 1 in which the uplink reference configuration 0 is set, in a case where transmission of the PUSCH is scheduled in [SFN=m, subframe n=9], a PHICH resource is determined from a second resource set in [SFN=m+1, subframe n=5].

Hereinafter, the downlink reference configuration will be described in detail.

The downlink reference configuration is used to specify (select, determine) a correspondence between the subframe n in which a PDSCH is allocated and the subframe n+k in which a HARQ-ACK corresponding to the PDSCH is transmitted.

FIG. 13 is a diagram illustrating a correspondence between the subframe n−k in which the PDSCH is allocated and the subframe n in which a HARQ-ACK corresponding to the PDSCH is transmitted in the present embodiment. The mobile station apparatus 1 specifies (selects, determines) a value of k on the basis of a table of FIG. 13.

In a case where the mobile station apparatus 1 detects, in a subframe n−k (k is specified on the basis of the table of FIG. 13) for a serving cell, transmission of the PDSCH intended for the mobile station apparatus 1 and for which a corresponding HARQ-ACK shall be transmitted, the HARQ-ACK is transmitted in the subframe n.

For example, the mobile station apparatus 1 does not make a response of the HARQ-ACK to transmission of the PDSCH which is used to transmit system information. For example, the mobile station apparatus 1 makes a response of the HARQ-ACK to transmission of the PDSCH which is scheduled by a DCI format including the CRC scrambled with the C-RNTI.

For example, the mobile station apparatus 1 in which the uplink reference configuration 1 is set performs transmission of the HARQ-ACK of the PDSCH received in the subframe n−6 and/or n−7 in the subframe n=2.

Further, the mobile station apparatus 1 in which the uplink reference configuration is set and the downlink reference configuration is not set may specify (select, determine) a correspondence between the subframe n−k in which a PDSCH is allocated and the subframe n in which a HARQ-ACK corresponding to the PDSCH is transmitted, according to the uplink reference configuration.

In addition, the mobile station apparatus 1 in which the uplink reference configuration is set and the downlink reference configuration is not set may determine the timings (subframes) at which downlink reception and uplink transmission are performed, according to the uplink reference configuration. The mobile station apparatus 1 in which the downlink reference configuration is not set may disregard the third information indicating a transmission direction configuration.

In addition, the mobile station apparatus 1 which has received the first information and has not received the second information may set the downlink reference configuration therein on the basis of the first information. The mobile station apparatus 1 which sets the downlink reference configuration therein on the basis of the first information may disregard the third information indicating a transmission direction configuration.

The mobile station apparatus 1 which sets the downlink reference configuration therein on the basis of the first information is also referred to as a mobile station apparatus 1 in which the dynamic TDD is not set. The mobile station apparatus 1 which sets the downlink reference configuration therein on the basis of the second information is also referred to as a mobile station apparatus 1 in which the dynamic TDD is set.

The mobile station apparatus 1 which sets the uplink reference configuration on the basis of the first information may perform a measurement (for example, a measurement regarding channel state information) using a downlink signal in a downlink subframe or a DwPTS of a special subframe which is indicated by the uplink reference configuration.

Therefore, in the dynamic TDD, if the base station apparatus 3 uses a subframe which is indicated as a downlink subframe by the uplink reference configuration, as a special subframe or an uplink subframe, or uses a subframe which is indicated as a special subframe by the uplink reference configuration, as an uplink subframe, there is a problem in that the mobile station apparatus 1 in which the t downlink reference configuration is set on the basis of the first information, cannot appropriately perform the measurement using a downlink signal.

Thus, the base station apparatus 3 determines a downlink reference configuration from a configuration set (configurations of the set) which is restricted on the basis of the uplink reference configuration. In other words, the downlink reference configuration is an element of the configuration set which is restricted on the basis of the uplink reference configuration. The configuration set restricted on the basis of the uplink reference configuration includes uplink-downlink configurations which satisfy the following conditions (a) to (c). FIG. 14 is a diagram of the relationship between a subframe indicated by the uplink reference configuration and a subframe indicated by the downlink reference configuration in a first embodiment of the present invention. In FIG. 14, D indicates a downlink subframe, U indicates an uplink subframe, and S indicates a special subframe.

(a) a subframe which is indicated as a downlink subframe by the uplink reference configuration is indicated as a downlink subframe (b) a subframe which is indicated as an uplink subframe by the uplink reference configuration is indicated as an uplink subframe or a downlink subframe (c) a subframe which is indicated as a special subframe by the uplink reference configuration is indicated as a downlink subframe or a special subframe Consequently, in the dynamic TDD, since a subframe which is indicated as a downlink subframe by the uplink reference configuration, and a DwPTS of a special subframe are not used for uplink transmission, the mobile station apparatus 1 in which the downlink reference configuration is set on the basis of the first information can appropriately perform a measurement using a downlink signal.

In addition, the mobile station apparatus 1 for which the downlink reference configuration is set on the basis of the second information may also perform a measurement (for example, a measurement regarding channel state information) using a downlink signal in a downlink subframe or a DwPTS of a special subframe indicated by the uplink reference configuration.

The base station apparatus 3 may perform scheduling of downlink transmission in a subframe which is indicated as a downlink subframe by the uplink reference configuration and the downlink reference configuration.

The base station apparatus 3 may perform scheduling of uplink transmission in a subframe which is indicated as an uplink subframe by the uplink reference configuration and the downlink reference configuration.

The base station apparatus 3 may perform scheduling of uplink transmission or downlink transmission in a subframe which is indicated as an uplink subframe by the uplink reference configuration and is indicated as a downlink subframe by the downlink reference configuration.

In other words, the base station apparatus 3 may use, as an uplink subframe or a downlink subframe, a subframe which is indicated as an uplink subframe by the uplink reference configuration and is indicated as a downlink subframe by the downlink reference configuration.

The base station apparatus 3 may perform scheduling of downlink transmission in a DwPTS of a subframe which is indicated as a special subframe by the uplink reference configuration and the downlink reference configuration.

The base station apparatus 3 may perform scheduling of uplink transmission in a UpPTS of a subframe which is indicated as a special subframe by the uplink reference configuration and the downlink reference configuration.

The base station apparatus 3 may perform scheduling of downlink transmission in a DwPTS of a subframe which is indicated as a special subframe by the uplink reference configuration and is indicated as a downlink by the downlink reference configuration.

The base station apparatus 3 may perform scheduling of uplink transmission in a UpPTS of a subframe which is indicated as a special subframe by the uplink reference configuration and is indicated as a downlink subframe by the downlink reference configuration.

The base station apparatus 3 may perform scheduling of downlink transmission in a subframe which is indicated as a special subframe by the uplink reference configuration and is indicated as a downlink by the downlink reference configuration.

In other words, the base station apparatus 3 may use, as a downlink subframe, a subframe which is indicated as a special subframe by the uplink reference configuration and is indicated as a downlink by the downlink reference configuration.

A subframe which is indicated as a special subframe by the uplink reference configuration and is indicated as a downlink subframe by the downlink reference configuration, and a subframe which is indicated as a special subframe by the uplink reference configuration and is indicated as a downlink subframe by the downlink reference configuration, are also referred to as flexible subframes.

Hereinafter, the transmission direction configuration will be described in detail.

If the mobile station apparatus 1 determines a transmission direction (up/down) on the basis of the uplink reference configuration, the downlink reference configuration, and scheduling information (a DCI format and/or a HARQ-ACK), there is a problem in that the mobile station apparatus 1 which erroneously receives/decodes the scheduling information (a DCI format and/or a HARQ-ACK) transmits an uplink signal in a subframe in which the base station apparatus 3 transmits a downlink signal to other mobile station apparatuses 1, and thus the uplink signal interferes with the downlink signal.

Therefore, the mobile station apparatus 1 of the present invention sets the transmission direction configuration regarding a transmission direction (up/down) in a subframe. The transmission direction configuration is used to determine a transmission direction in a subframe.

The base station apparatus 3 transmits the third information indicating the transmission direction configuration to the mobile station apparatus 1. The third information is information indicating a subframe in which uplink transmission can be performed. The third information is information indicating a subframe in which downlink transmission can be performed. The third information is information indicating a subframe in which uplink transmission in the UpPTS and downlink transmission in the DwPTS can be performed.

For example, the transmission direction configuration is used to specify a transmission direction in a subframe which is indicated as an uplink subframe by the uplink reference configuration and is indicated as a downlink subframe by the downlink reference configuration, and/or a subframe which is indicated as a special subframe by the uplink reference configuration and is indicated as a downlink subframe by the downlink reference configuration. In other words, the transmission direction configuration is used to specify a transmission direction in a subframe which is indicated as a subframe which is different from a subframe which is indicated by the uplink reference configuration and the downlink reference configuration.

FIG. 15 is a diagram illustrating the relationship between a subframe indicated by the uplink reference configuration, a subframe indicated by the downlink reference configuration, and a subframe indicated by the transmission direction configuration in the first embodiment of the present invention. In FIG. 15, D indicates a downlink subframe, U indicates an uplink subframe, and S indicates a special subframe.

The base station apparatus 3 determines the transmission direction configuration from a configuration set (configurations of the set) which is restricted on the basis of the uplink reference configuration and the downlink reference configuration. In other words, the transmission direction configuration is an element of the configuration set which is restricted on the basis of the uplink reference configuration and the downlink reference configuration. The configuration set which is restricted on the basis of the uplink reference configuration and the downlink reference configuration includes uplink-downlink configurations which satisfy the following conditions (d) to (h).

(d) a subframe which is indicated as a downlink subframe by the uplink reference configuration and the downlink reference configuration is indicated as a downlink subframe (e) a subframe which is indicated as an uplink subframe by the uplink reference configuration and the downlink reference configuration is indicated as an uplink subframe (f) a subframe which is indicated as an uplink subframe by the uplink reference configuration but is indicated as a downlink subframe by the downlink reference configuration is indicated as an uplink subframe or a downlink subframe (g) a subframe which is indicated as a special subframe by the uplink reference configuration and the downlink reference configuration is indicated as a special subframe (h) a subframe which is indicated as a special subframe by the uplink reference configuration but is indicated as a downlink subframe by the downlink reference configuration is indicated as a special subframe or a downlink subframe The base station apparatus 3 may perform scheduling of downlink transmission in a subframe which is indicated as a downlink subframe by the transmission direction configuration.

The mobile station apparatus 1 may perform a reception process of a downlink signal in a subframe which is indicated as a downlink subframe by the transmission direction configuration. The mobile station apparatus 1 may perform monitoring of the PDCCH/EPDCCH in a subframe which is indicated as a downlink subframe by the transmission direction configuration. In a case where the mobile station apparatus 1 detects a downlink grant via the PDCCH/EPDCCH in a subframe which is indicated as a downlink subframe by the transmission direction configuration, the mobile station apparatus may perform a reception process of a PDSCH corresponding to the downlink grant in the subframe.

In a case where transmission of an uplink signal (PUSCH/SRS) in a subframe indicated as a downlink subframe by the transmission direction configuration is scheduled by using downlink control information which is received via the PDCCH/EPDCCH, the mobile station apparatus 1 does not perform a transmission process of the uplink signal (PUSCH/SRS) in the subframe.

The base station apparatus 3 may perform scheduling of uplink transmission in a subframe which is indicated as an uplink subframe by the transmission direction configuration.

The base station apparatus 3 may perform scheduling of downlink transmission in a subframe which is indicated as an uplink subframe by the transmission direction configuration. The base station apparatus 3 may be prohibited from performing scheduling of downlink transmission in a subframe which is indicated as an uplink subframe by the transmission direction configuration.

The mobile station apparatus 1 may perform a transmission process of an uplink signal in a subframe which is indicated as an uplink subframe by the transmission direction configuration. The mobile station apparatus 1 may perform a transmission process of PUSCH/DMRS/SRS in a subframe which is indicated as an uplink subframe by the transmission direction configuration. In a case where transmission of the uplink signal (PUSCH/SRS) in a subframe indicated as an uplink subframe by the transmission direction configuration is scheduled by downlink control information received via the PDCCH/EPDCCH, the mobile station apparatus 1 may perform a transmission process of the uplink signal (PUSCH/SRS) in the subframe.

The mobile station apparatus 1 may perform a reception process of a downlink signal in a subframe which is indicated as an uplink subframe by the transmission direction configuration and in which uplink transmission is not scheduled. The mobile station apparatus 1 may be prohibited from performing a reception process of a downlink signal in a subframe which is indicated as an uplink subframe by the transmission direction configuration.

The base station apparatus 3 performs scheduling of downlink transmission in a DwPTS of a subframe which is indicated as a special subframe by the transmission direction configuration.

The mobile station apparatus 1 may perform a reception process of a downlink signal in a DwPTS of a subframe which is indicated as a special subframe by the transmission direction configuration. The mobile station apparatus 1 may perform monitoring of the PDCCH/EPDCCH in a DwPTS of a subframe which is indicated as a special subframe by the transmission direction configuration. In a case where the mobile station apparatus 1 detects a downlink grant via the PDCCH/EPDCCH in a DwPTS of a subframe which is indicated as a special subframe by the transmission direction configuration, the mobile station apparatus may perform a reception process of a PDSCH corresponding to the downlink grant in the DwPTS of the subframe.

In a case where transmission of a PUSCH in a subframe indicated as a special subframe by the transmission direction configuration is scheduled by downlink control information received via the PDCCH/EPDCCH, the mobile station apparatus 1 does not perform a transmission process of the PUSCH in the subframe.

In a case where transmission of an SRS in a UpPTS of a subframe indicated as a special subframe by the transmission direction configuration is scheduled by downlink control information received via the PDCCH/EPDCCH, the mobile station apparatus 1 may perform a transmission process of the SRS in the UpPTS of the subframe.

FIG. 16 is a diagram illustrating a relationship between the uplink reference configuration, the downlink reference configuration, and the transmission direction configuration, in the first embodiment of the present invention.

In FIG. 16, in a case where an uplink-downlink configuration of the uplink reference configuration is 0, the downlink reference configuration is one of the uplink-downlink configuration set {0, 1, 2, 3, 4, 5, 6}.

In FIG. 16, in a case where an uplink-downlink configuration of the uplink reference configuration is 1, the downlink reference configuration is one of the uplink-downlink configuration set {2, 4, 5}.

In FIG. 16, in a case where an uplink-downlink configuration of the uplink reference configuration is 2, the downlink reference configuration is the uplink-downlink configuration set {5}. In other words, in a case where an uplink-downlink configuration of the uplink reference configuration is 2, the downlink reference configuration is the uplink-downlink configuration 5.

In FIG. 16, in a case where an uplink-downlink configuration of the uplink reference configuration is 3, the downlink reference configuration is one of the uplink-downlink configuration set {4, 5}.

In FIG. 16, in a case where an uplink-downlink configuration of the uplink reference configuration is 4, the downlink reference configuration is the uplink-downlink configuration set {5}. In other words, in a case where an uplink-downlink configuration of the uplink reference configuration is 4, the downlink reference configuration is the uplink-downlink configuration 5.

In FIG. 16, in a case where an uplink-downlink configuration of the uplink reference configuration is 5, the downlink reference configuration and the transmission direction configuration are not set.

In FIG. 16, in a case where an uplink-downlink configuration of the uplink reference configuration is 0, the downlink reference configuration is one of the uplink-downlink configuration set {0, 1, 2, 3, 4, 5}.

For example, in FIG. 16, in a case where an uplink-downlink configuration of the uplink reference configuration is 0 and an uplink-downlink configuration of the downlink reference configuration is 1, the transmission direction configuration is one of the uplink-downlink configuration set {0, 1, 6}.

In addition, an uplink-downlink configuration of the downlink reference configuration may be the same as an uplink-downlink configuration of the uplink reference configuration. However, in order for the mobile station apparatus 1 which has not received the second information to set the same uplink-downlink configuration as an uplink-downlink configuration of the uplink reference configuration as the downlink reference configuration, an uplink-downlink configuration of the downlink reference configuration indicated by the second information is not preferably the same as an uplink-downlink configuration of the uplink reference configuration indicated by the first information.

Figure 17:
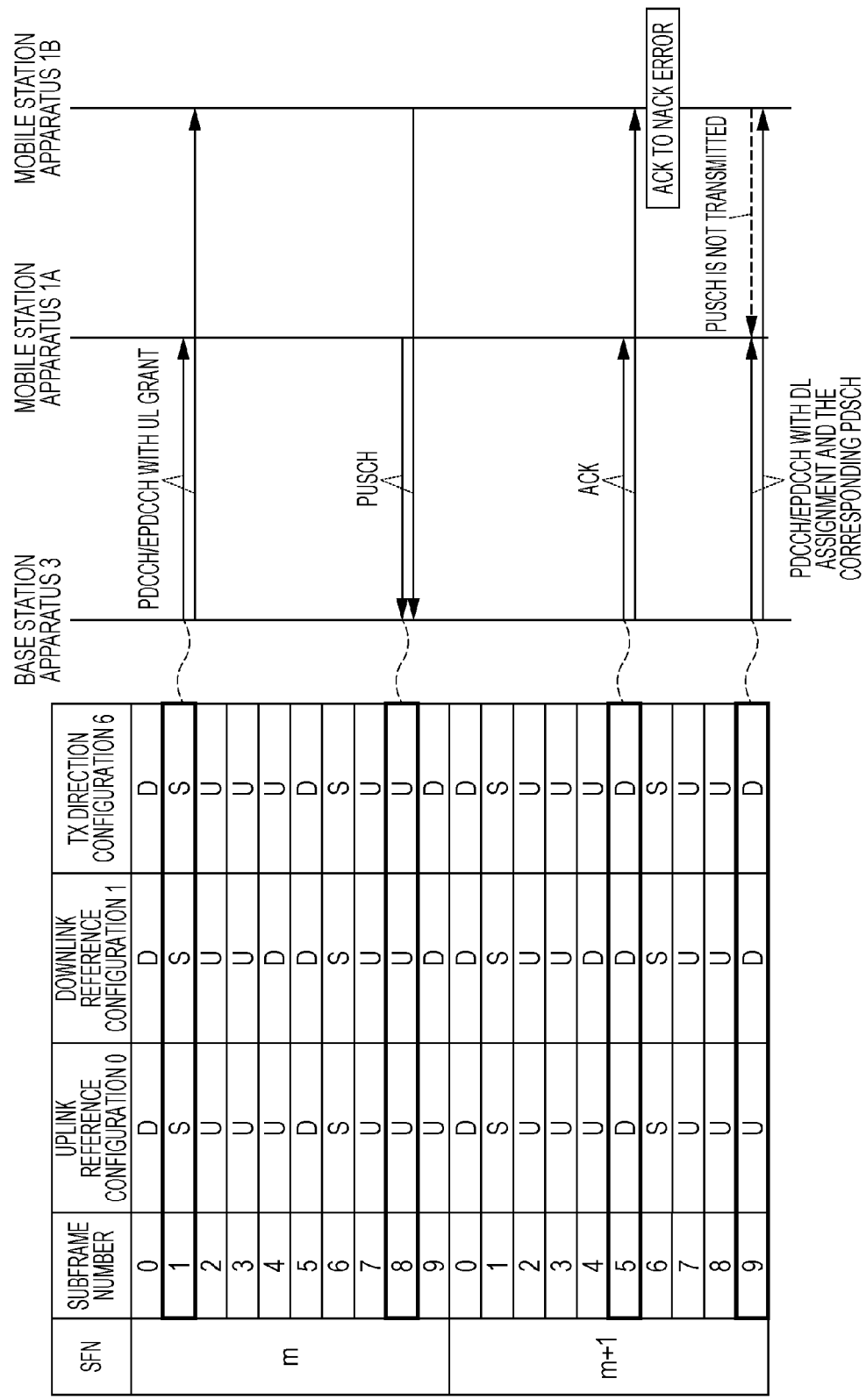
FIG. 17 is a diagram illustrating an example of communication between the base station apparatus 3 and the mobile station apparatuses 1 (1A and 1B) in the first embodiment of the present invention.

FIG. 17 is a diagram illustrating an example of communication between the base station apparatus 3 and the mobile station apparatuses 1 (1A and 1B) in the first embodiment of the present invention. In FIG. 17, the uplink reference configuration 0, the downlink reference configuration 1, and the transmission direction configuration 6 are set in each of the mobile station apparatus 1A and the mobile station apparatus 1B. In FIG. 17, the mobile station apparatus 1A succeeds in decoding an ACK, but the mobile station apparatus 1B detects the ACK as a NACK.

The Base station apparatus 3 transmits an uplink grant to each of the mobile station apparatus 1A and the mobile station apparatus 1B via the PDCCH/EPDCCH in [SFN=m, subframe n=1].

Each of the mobile station apparatus 1A and the mobile station apparatus 1B transmits data via a PUSCH corresponding to the uplink grant in [SFN=m, subframe n=8].

The base station apparatus 3 transmits a HARQ indicator indicating an ACK to each of the mobile station apparatus 1A and the mobile station apparatus 1B in [SFN=m+1, subframe n=5].

In addition, the base station apparatus 3 transmits a downlink grant to each of the mobile station apparatus 1A and the mobile station apparatus 1B via the PDCCH/EPDCCH and transmits data to each of the mobile station apparatus 1A and the mobile station apparatus 1B via a PDSCH corresponding to the PDCCH/EPDCCH, in [SFN=m+1, subframe n=9].

The mobile station apparatus 1A which has succeeded in decoding the ACK does not retransmit data via the PUSCH and monitors the PDCCH/EPDCCH in [SFN=m+1, subframe n=9].

The mobile station apparatus 1B which has succeeded in decoding the ACK does not retransmit data via the PUSCH and monitors the PDCCH/EPDCCH in [SFN=m+1, subframe n=9].

The mobile station apparatus 1B which has decoded the ACK as a NACK considers retransmission of data using the PUSCH to be scheduled in [SFN=m+1, subframe n=9], but does not retransmit the data via the PUSCH since [SFN=m+1, subframe n=9] is indicated as a downlink subframe by the transmission direction configuration. In addition, the mobile station apparatus 1B monitors the PDCCH/EPDCCH in [SFN=m+1, subframe n=9].

In order to transmit a downlink signal in [SFN=m+1, subframe n=9], the base station apparatus 3 may transmit a HARQ indicator indicating an ACK to each of the mobile station apparatus 1A and the mobile station apparatus 1B in [SFN=m+1, subframe n=5] even if there is a failure in decoding the data received via the PUSCH in [SFN=m, subframe n=8].

The base station apparatus 3 of the first embodiment includes the subframe setting portion 3013 that determines a downlink reference configuration (second configuration) from a configuration set which is restricted on the basis of an uplink reference configuration (first configuration), and determines a transmission direction configuration (third configuration) from a configuration set which is restricted on the basis of the uplink reference configuration (first configuration) and the downlink reference configuration (second configuration); and the transmission unit 307 that transmits first information indicating the uplink reference configuration (first configuration), second information indicating the downlink reference configuration (second configuration), and third information indicating the transmission direction configuration (third configuration).

The mobile station apparatus 1 of the first embodiment includes the reception unit 105 that receives first information indicating an uplink reference configuration (first configuration), second information indicating a downlink reference configuration (second configuration), and third information indicating a transmission direction configuration (third configuration); and the subframe setting portion 1013 that sets the uplink reference configuration (first configuration), the downlink reference configuration (second configuration), and the transmission direction configuration (third configuration).

As mentioned above, since the transmission direction configuration is used, the mobile station apparatus 1B can be prevented from making a transmission error of using a PUSCH in [SFN=m+1, subframe n=9], and thus it is possible to avoid the PUSCH from being transmitted by the mobile station apparatus 1B and interfering with the mobile station apparatus 1A, and thus the mobile station apparatus 1B can correctly monitor the PDCCH/EPDCCH.

In addition, since the transmission direction configuration is defined by an uplink-downlink configuration, it is possible to more efficiently set a transmission direction than by using a method of giving an instruction for a transmission direction for each subframe.

Hereinafter, a second embodiment of the present invention will be described.

Hereinafter, unless otherwise stated, the content described in the first embodiment can also be applied to the second embodiment. Hereinafter, unless otherwise stated, the mobile station apparatus 1 of the second embodiment can perform the same process as that by the mobile station apparatus 1 of the first embodiment, and the base station apparatus 3 of the second embodiment can perform the same process as that by the base station apparatus 3 of the first embodiment.

In the second embodiment, as a configuration set which is restricted on the basis of the uplink reference configuration (first configuration) and the downlink reference configuration (second configuration), a configuration set (configurations of the set) is used which is constituted by uplink-downlink configurations of the uplink reference configuration (first configuration) and uplink-downlink configurations of the downlink reference configuration (second configuration).

FIG. 18 is a diagram illustrating an uplink reference configuration, a downlink reference configuration, and a transmission direction configuration, in the second embodiment of the present invention.

For example, in FIG. 18, in a case where an uplink-downlink configuration of the uplink reference configuration is 0 and an uplink-downlink configuration of the downlink reference configuration is 1, the transmission direction configuration is one of the uplink-downlink configuration set {0, 1}.

The subframe setting portion 3013 of the base station apparatus 3 of the second embodiment determines the transmission direction configuration (third configuration) from a configuration set (configurations of the set) constituted by uplink-downlink configurations of the uplink reference configuration (first configuration) and uplink-downlink configurations of the downlink reference configuration (second configuration). The subframe setting portion 3013 of the base station apparatus 3 of the second embodiment determines where a transmission direction is based on the uplink reference configuration or the downlink reference configuration. The transmission unit 307 of the base station apparatus 3 of the second embodiment transmits fourth information indicating whether a transmission direction is based the uplink reference configuration or the downlink reference configuration, instead of the third information.

The reception unit 105 of the mobile station apparatus 1 of the second embodiment receives the fourth information instead of the third information. The subframe setting portion 1013 of the mobile station apparatus 1 of the second embodiment sets whether a transmission direction is based on the uplink reference configuration or the downlink reference configuration, on the basis of the fourth information. The subframe setting portion 1013 of the mobile station apparatus 1 of the second embodiment sets the third configuration on the basis of the received fourth information.

The fourth information may be information indicating a transmission direction configuration (third configuration) selected from a configuration set (configurations of the set) constituted by uplink-downlink configurations of the uplink reference configuration and uplink-downlink configurations of the downlink reference configuration. The fourth information preferably has 1 bit.

The fourth information indicates that a subframe in which an uplink signal (for example, a PUSCH and/or an SRS) can be transmitted is to be specified on the basis of one of the uplink reference configuration and the downlink reference configuration. The subframe setting portion 1013 of the mobile station apparatus 1 specifies a subframe in which uplink transmission can be performed, on the basis of an uplink reference configuration or a downlink reference configuration indicated by the fourth information.

The fourth information indicates that a subframe for monitoring a downlink signal is to be specified on the basis of one of the uplink reference configuration and the downlink reference configuration. The subframe setting portion 1013 of the mobile station apparatus 1 specifies a subframe for monitoring a downlink signal, on the basis of an uplink reference configuration or a downlink reference configuration indicated by the fourth information.

In a case where uplink transmission is scheduled/set in a subframe which is regarded as uplink transmission not being possible on the basis of an uplink reference configuration or a downlink reference configuration indicated by the fourth information, the mobile station apparatus 1 does not perform the uplink transmission process in the subframe.

In a case where a PUSCH is scheduled to be transmitted in a subframe which is regarded as PUSCH transmission not being possible on the basis of an uplink reference configuration or a downlink reference configuration indicated by the fourth information, the mobile station apparatus 1 does not transmit the PUSCH in the subframe.

In a case where an SRS is scheduled to be transmitted in a subframe which is regarded as SRS transmission not being possible on the basis of an uplink reference configuration or a downlink reference configuration indicated by the fourth information, the mobile station apparatus 1 does not transmit the SRS in the subframe.

As mentioned above, the transmission direction configuration is determined from a configuration set (configurations of the set) constituted by uplink-downlink configurations of the uplink reference configuration and uplink-downlink configurations of the downlink reference configuration, and thus it is possible to further reduce the number of bits of the fourth information than in the third information of the first embodiment.

Hereinafter, a third embodiment of the present invention will be described.

Hereinafter, unless otherwise stated, the content described in the first or second embodiment can also be applied to the third embodiment. Hereinafter, unless otherwise stated, the mobile station apparatus 1 of the third embodiment can perform the same process as that by the mobile station apparatus 1 of the first or second embodiment, and the base station apparatus 3 of the third embodiment can perform the same process as that by the base station apparatus 3 of the first or second embodiment.

In the same manner as in the mobile station apparatus 1 of the first or second embodiment, the mobile station apparatus 1 of the third embodiment specifies (selects, determines) a transmission direction (up/down) on the basis of a transmission direction configuration. In the third embodiment, the mobile station apparatus 1 further specifies (selects, determines) a transmission direction (up/down) of a period in which a transmission direction configuration is not set.

In a case where an uplink reference configuration, a downlink reference configuration, and a transmission direction configuration, the mobile station apparatus 1 specifies (selects, determines) a transmission direction (up/down) on the basis of the transmission direction configuration.

In a case where an uplink reference configuration is set, and a downlink reference configuration and a transmission direction configuration are not set, the mobile station apparatus 1 specifies (selects, determines) a transmission direction (up/down) on the basis of the uplink reference configuration.

In a case where an uplink reference configuration and a downlink reference configuration are set, and a transmission direction configuration is not set, the mobile station apparatus 1 specifies (selects, determines) a transmission direction (up/down) on the basis of the downlink reference configuration. In other words, the uplink reference configuration and the downlink reference configuration are set, and an instruction for the transmission direction configuration is not given, the mobile station apparatus 1 sets an uplink-downlink configuration of the downlink reference configuration to the transmission direction configuration as a default.

The mobile station apparatus 1 in which the uplink reference configuration, the downlink reference configuration, and the transmission direction configuration have been set may clear/discard the transmission direction configuration in a case where the downlink reference configuration is reset. In addition, the mobile station apparatus 1 in which the uplink reference configuration, the downlink reference configuration, and the transmission direction configuration have been set may not clear/discard the transmission direction configuration in a case where the reset downlink reference configuration is the same as the previous downlink reference configuration. In other words, the mobile station apparatus 1 in which the uplink reference configuration, the downlink reference configuration, and the transmission direction configuration have been set may clear/discard the transmission direction configuration in a case where the downlink reference configuration is changed.

In a period/case in which the transmission direction configuration is not set, the subframe setting portion 1013 of the mobile station apparatus 1 of the third embodiment specifies (selects, determines) a transmission direction (up/down) on the basis of the downlink reference configuration. In addition, in a case where the downlink reference configuration is reset/changed, the subframe setting portion 1013 of the mobile station apparatus 1 of the third embodiment may clear/discard the transmission direction configuration.

In a case where the mobile station apparatus 1 is instructed to reset/change the downlink reference configuration, the subframe setting portion 3013 of the mobile station apparatus 3 of the third embodiment may regard the transmission direction configuration of the mobile station apparatus 1 as being cleared/discarded.

Figure 19:
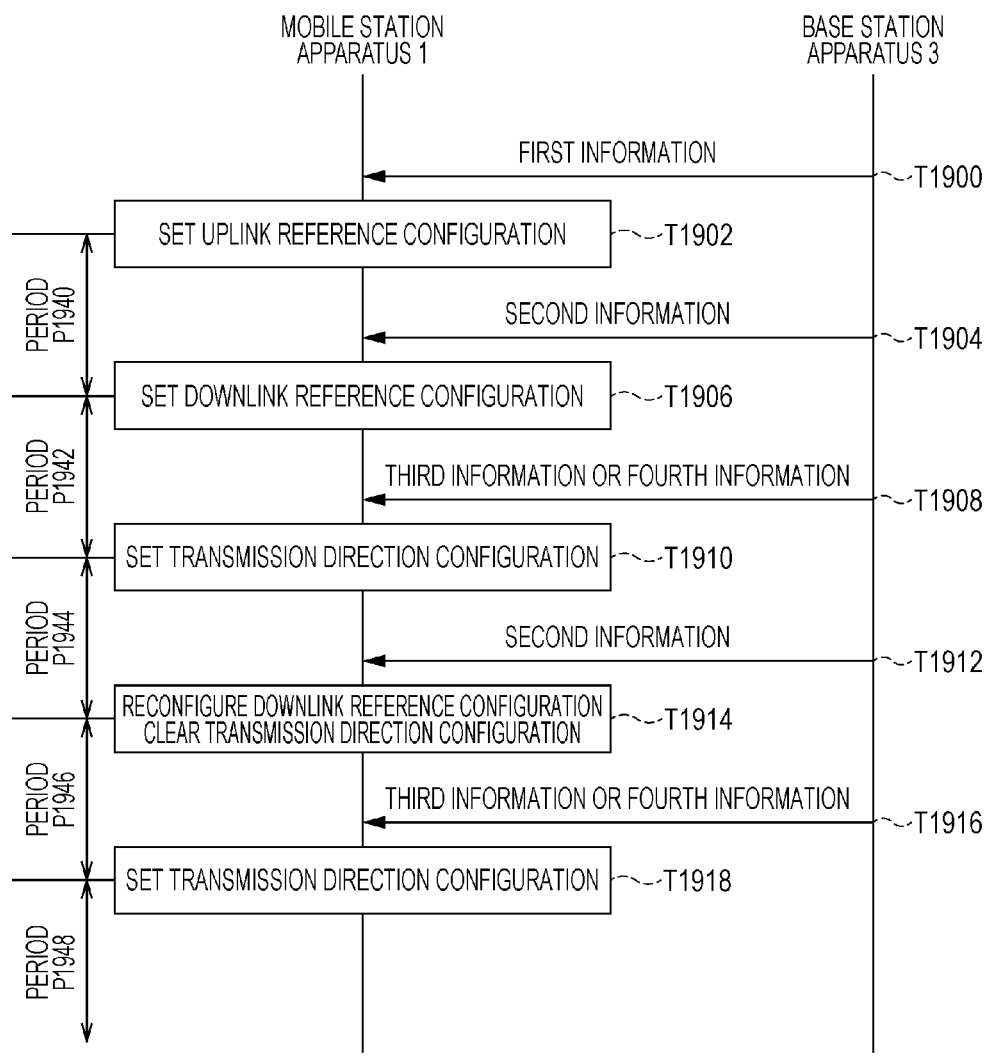
FIG. 19 is a sequence diagram illustrating an example of a third embodiment of the present invention.

FIG. 19 is a sequence diagram illustrating an example of the third embodiment of the present invention.

In T1900, the base station apparatus 3 transmits the first information. In T1902, the mobile station apparatus 1 sets an uplink reference configuration on the basis of the first information. In T1904, the base station apparatus 3 transmits the second information. In T1906, the mobile station apparatus 1 sets a downlink reference configuration on the basis of the second information. In T1908, the base station apparatus 3 transmits the third information or the fourth information. In T1910, the mobile station apparatus 1 sets a transmission direction configuration on the basis of the third information or the fourth information.

In T1912, the base station apparatus 3 transmits the second information. In T1914, the mobile station apparatus 1 resets a downlink reference configuration on the basis of the second information, and clears/discards the transmission direction configuration set in T1910. In T1916, the base station apparatus 3 transmits the third information or the fourth information. In T1918, the mobile station apparatus 1 resets a transmission direction configuration on the basis of the third information or the fourth information.

In a period P1940 until the downlink reference configuration is initially set, the mobile station apparatus 1 specifies (selects, determines) a transmission direction (up/down) on the basis of the uplink reference configuration.

In a period P1942 after the downlink reference configuration is set until the transmission direction configuration is initially set, the mobile station apparatus 1 specifies (selects, determines) a transmission direction (up/down) on the basis of the downlink reference configuration.

In a period P1944 after the transmission direction configuration is set until the transmission direction configuration is cleared, the mobile station apparatus 1 specifies (selects, determines) a transmission direction (up/down) on the basis of the transmission direction configuration.

In a period P1946 after the transmission direction configuration is cleared (the downlink reference configuration is reset/changed) until the next transmission direction configuration is set, the mobile station apparatus 1 specifies (selects, determines) a transmission direction (up/down) on the basis of the downlink reference configuration.

In a period P1948 after the downlink reference configuration is set, the mobile station apparatus 1 specifies (selects, determines) a transmission direction (up/down) on the basis of the transmission direction configuration.

In addition, in T1902, the mobile station apparatus 1 may set an uplink reference configuration and a downlink reference configuration on the basis of the first information, and, in T1906, the mobile station apparatus 1 may reset a downlink reference configuration on the basis of the second information. In this case, in the period P1940, the mobile station apparatus 1 specifies (selects, determines) a transmission direction (up/down) on the basis of the downlink reference configuration.

The mobile station apparatus 1 receives the second information, determines a subframe in which an uplink signal can be transmitted on the basis of the second information, and then monitors whether or not the third information or the fourth information is received. If the third information or fourth is received, a subframe is determined in which an uplink signal can be transmitted on the basis of the third information or the fourth information.

For example, the base station apparatus 3 transmits the third information or the fourth information to the mobile station apparatus 1 by using the PDCCH/EPDCCH. The third information or the fourth information is used to control a dynamic TDD operation in coverage of the base station apparatus 3 (cell). The third information or the fourth information is transmitted in common to a plurality of mobile station apparatuses 1. The third information or the fourth information is transmitted and received in a common search space (CSS) or a UE-specific search space (USS).

The CSS is a common space in which the plurality of mobile station apparatuses 1 monitor the PDCCH/EPDCCH. The USS is a space which is defined on the basis of at least a C-RNTI. The C-RNTI is an identifier which is uniquely assigned to the mobile station apparatus 1.

Not the C-RNTI but a common identifier is preferably used for the PDCCH/EPDCCH which is used to transmit and receive the third information or the fourth information. In addition, a subframe may be restricted which is used for the mobile station apparatus 1 to monitor the PDCCH/EPDCCH including the third information or the fourth information. The base station apparatus 3 may control a subframe which is used for the mobile station apparatus 1 to monitor the PDCCH/EPDCCH including the third information or the fourth information.

For example, the PDCCH/EPDCCH including the third information or the fourth information may be allocated at intervals of ten subframes. For example, the mobile station apparatus 1 monitors the third information at intervals of ten subframes. A subframe in which the PDCCH/EPDCCH including the third information may be determined in advance. For example, the third information may be allocated only in the subframe 0 of the radio frame.

The base station apparatus 3 transmits the third information or the fourth information only in a case where it is determined that the third information is necessary. For example, in a case where it is determined that the transmission direction configuration is changed, the base station apparatus 3 transmits the third information or the fourth information. For example, in a case where it is determined that the mobile station apparatus 1 which starts a dynamic TDD operation is required to be notified of the third information, the base station apparatus 3 transmits the third information or the fourth information thereto.

The mobile station apparatus 1 which starts the dynamic TDD operation monitors downlink control information including the third information or the fourth information in a subframe in which the PDCCH/EPDCCH including the third information or the fourth information is allocated.

The mobile station apparatus 1 tries to decode a received signal and determines whether or not the PDCCH/EPDCCH including the third information or the fourth information is detected. In a case where the PDCCH/EPDCCH including the third information or the fourth information is detected, the mobile station apparatus 1 determines a subframe in which an uplink signal can be transmitted on the basis of the detected third information or the fourth information. In a case where the PDCCH/EPDCCH including the third information or the fourth information is not detected, the mobile station apparatus 1 may maintain a determination hitherto regarding a subframe in which an uplink signal can be transmitted.

As mentioned above, in a period/case in which a transmission direction configuration is not set, a transmission direction (up/down) is specified (selected, determined) on the basis of not an uplink reference configuration but a downlink reference configuration, and thus it is possible to further reduce a probability that the mobile station apparatus 1 may erroneously perform uplink transmission.

For example, even if the third information indicates, as a downlink subframe, a subframe which is indicated as an uplink subframe by an uplink reference configuration but is indicated as a downlink subframe by a downlink reference configuration, and the mobile station apparatus 1 fails to decode the third information, it is possible to prevent the mobile station apparatus 1 from performing uplink transmission in the subframe.

In addition, in a case where an uplink reference configuration is reset, the mobile station apparatus 1 in which the uplink reference configuration, a downlink reference configuration, and a transmission direction configuration have been set may clear/discard the downlink reference configuration and the transmission direction configuration.

Hereinafter, a fourth embodiment of the present invention will be described.

Hereinafter, unless otherwise stated, the content described in the first to third embodiments can also be applied to the fourth embodiment. Hereinafter, unless otherwise stated, the mobile station apparatus 1 of the fourth embodiment can perform the same process as that by the mobile station apparatus 1 of the first to third embodiments, and the base station apparatus 3 of the fourth embodiment can perform the same process as that by the base station apparatus 3 of the first to third embodiments.

The subframe setting portion 1013 of the mobile station apparatus 1 of the fourth embodiment manages a timer. The subframe setting portion 1013 makes a transmission direction configuration valid only in a period in which the timer is running. If the timer starts once, the timer is running until the timer stops or the timer expires. Otherwise, the timer is not running.

The subframe setting portion 1013 starts the timer when a transmission direction configuration is set. The subframe setting portion 1013 may start the timer in a case where the third information or the fourth information indicating a transmission direction configuration is received.

If the timer has already run when a transmission direction configuration i set, the subframe setting portion 1013 restarts the timer. If the timer has already run when the third information or the fourth information indicating a transmission direction configuration is received, the subframe setting portion 1013 may restart the timer.

When an uplink reference configuration or a downlink reference configuration is reset/changed, the subframe setting portion 1013 clears the transmission direction configuration and stops the timer. When the timer expires, the subframe setting portion 1013 clears the transmission direction configuration.

The subframe setting portion 3013 of the base station apparatus 3 of the fourth embodiment determines a configuration (for example, duration of a timer) regarding the timer, generates fifth information indicating the configuration regarding the timer, and transmits the fifth information to the mobile station apparatus 1 via the transmission unit 307. The subframe setting portion 1013 of the mobile station apparatus 1 sets the configuration regarding the timer on the basis of the fifth information.

In addition, the duration of the timer may be infinite. Further, the fifth information may be transmitted along with the second information. Still further, the fifth information may be transmitted along with the third information or the fourth information.

Figure 20:
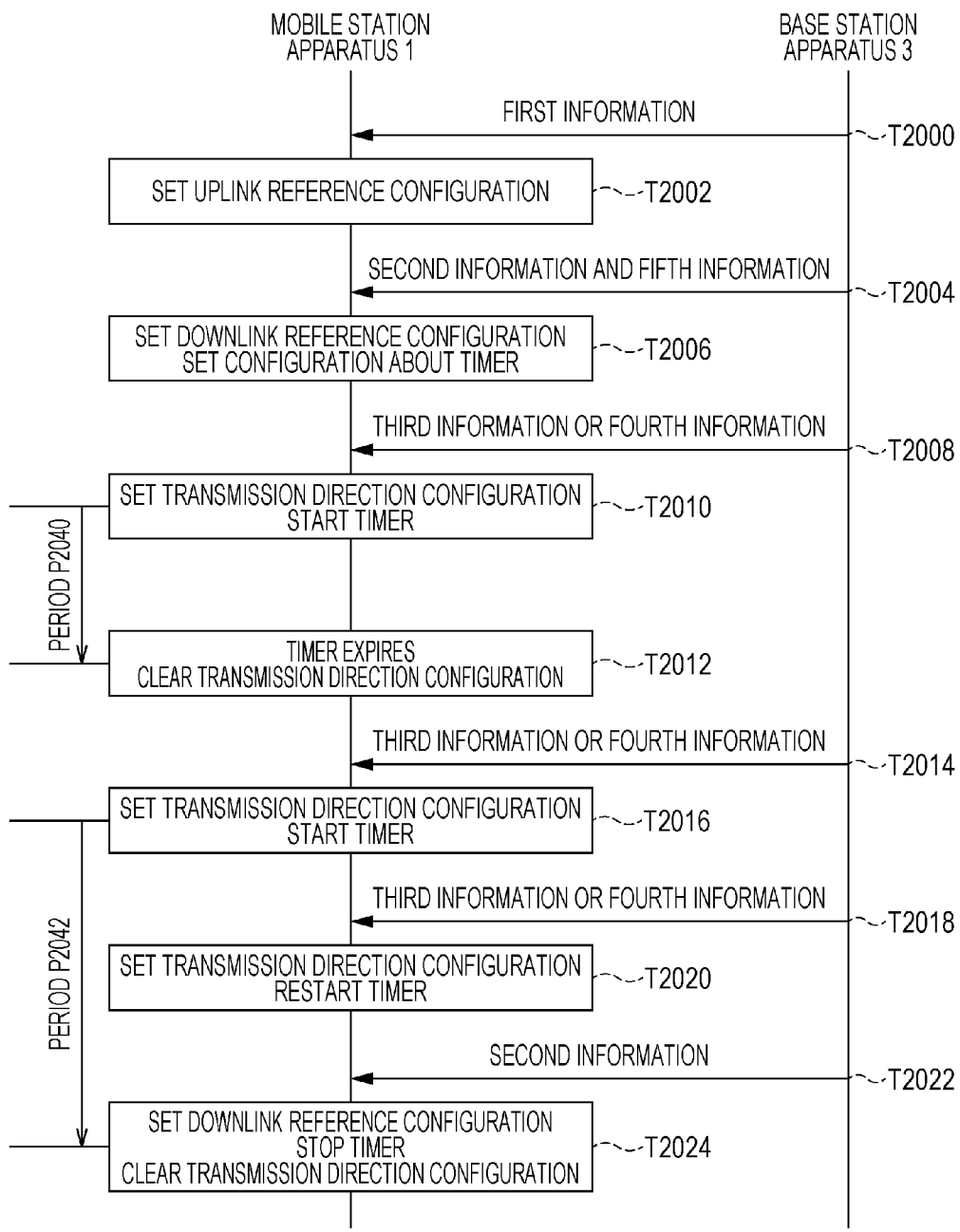
FIG. 20 is a sequence diagram illustrating an example of a fourth embodiment of the present invention.

FIG. 20 is a sequence diagram illustrating an example of the fourth embodiment of the present invention. In FIG. 20, in a period P2040 and a period P2042, the timer is running In T2000, the base station apparatus 3 transmits the first information. In T2002, the mobile station apparatus 1 sets an uplink reference configuration on the basis of the first information. In T2004, the base station apparatus 3 transmits the second information and the fifth information. In T2006, the mobile station apparatus 1 sets a downlink reference configuration on the basis of the second information, and sets a configuration regarding the timer on the basis of the fifth information. In T2008, the base station apparatus 3 transmits the third information or the fourth information.

In T2010, the mobile station apparatus 1 sets a transmission direction configuration on the basis of the third information or the fourth information, and starts the timer. In T2012, the timer expires, and the mobile station apparatus 1 clears the transmission direction configuration. In T2014, the base station apparatus 3 transmits the third information or the fourth information. In T2016, the mobile station apparatus 1 sets a transmission direction configuration again on the basis of the third information or the fourth information, and starts the timer. In T2018, the base station apparatus 3 transmits the third information or the fourth information.

In T2020, the mobile station apparatus 1 sets/resets/changes a transmission direction configuration on the basis of the third information or the fourth information, and restarts the timer. In T2022, the base station apparatus 3 transmits the second information. In T2024, the mobile station apparatus 1 sets/resets/changes a transmission direction configuration on the basis of the second information, stops the timer, and clears the transmission direction configuration.

As mentioned above, since the timer is used, it is possible to further reduce a probability that the mobile station apparatus 1 may erroneously perform uplink transmission.

For example, even if the mobile station apparatus 1 fails to decode the third information for resetting a transmission direction configuration, the mobile station apparatus 1 clears the transmission direction configuration on the basis of expiration of the timer, and does not an uplink transmission process in a subframe which is indicated as an uplink subframe by an uplink reference configuration but is indicated as a downlink reference configuration by a downlink reference configuration. Thus, it is possible to prevent the mobile station apparatus 1 from performing uplink transmission in the subframe.

Hereinafter, a fifth embodiment of the present invention will be described.

Hereinafter, unless otherwise stated, the content described in the first to third embodiments can also be applied to the fifth embodiment. Hereinafter, unless otherwise stated, the mobile station apparatus 1 of the fifth embodiment can perform the same process as that by the mobile station apparatus 1 of the first to third embodiments, and the base station apparatus 3 of the fifth embodiment can perform the same process as that by the base station apparatus 3 of the first to third embodiments.

The base station apparatus 3 of the fifth embodiment transmits an MIB including the third information or the fourth information to the mobile station apparatus 1.

The mobile station apparatus 1 of the fifth embodiment specifies a period in which a transmission direction configuration is valid on the basis of a transmission periodicity of the MIB. The mobile station apparatus 1 may regard that a transmission direction configuration in a certain MIB transmission periodicity is valid until a subframe in which the transmission direction configuration can be reset by an MIB which is initially transmitted in the next MIB transmission periodicity.

Figure 21:
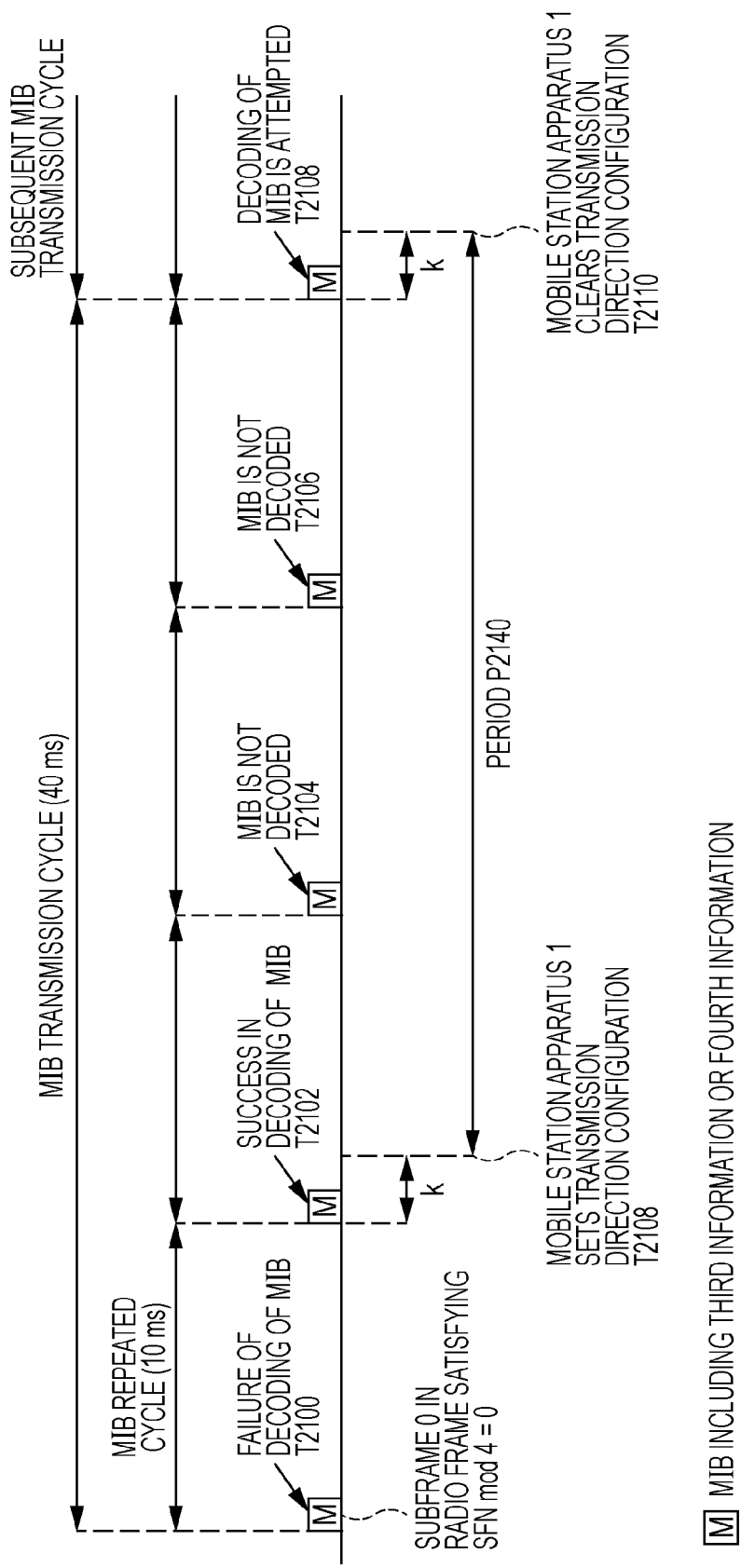
FIG. 21 is a diagram illustrating an example of a fifth embodiment of the present invention.

FIG. 21 is a diagram illustrating an example of the fifth embodiment of the present invention. Initial transmission of the MIB is performed in a subframe 0 of a radio frame satisfying SFN mod 4=0, and retransmission (repetition) of the MIB is performed in subframes 0 of all other radio frames. In FIG. 21, the MIB transmitted in T2100 is repeatedly transmitted in T2102, T2104, and T2106.

In T2100 of FIG. 21, the mobile station apparatus 1 fails to decode the MIB which is transmitted via a PBCH. In T2102 of FIG. 21, the mobile station apparatus 1 succeeds in decoding the MIB which is retransmitted via the PBCH. In T2104 and T2106 of FIG. 21, the mobile station apparatus 1 may not try to decode the MIB. In T2108 of FIG. 21, the mobile station apparatus 1 tries to decode the MIB which is initially transmitted in the next MIB transmission periodicity.

In FIG. 21, in a case where the MIB including the third information or the fourth information is received via the PBCH in a subframe n–k (T2102), the mobile station apparatus 1 sets (makes valid) a transmission direction configuration in a subframe n (T2110). For example, k is 4. For example, k is determined on the basis of the table of FIG. 13 and a downlink reference configuration.

The mobile station apparatus 1 makes the transmission direction configuration valid in a period P2140. The mobile station apparatus 1 may clear the transmission direction configuration in a subframe (T2112) which is k or k–1 later than a subframe (T2108) in which the MIB is initially transmitted in the next MIB transmission periodicity.

In addition, in a period in which a transmission direction configuration is not set, the mobile station apparatus 1 preferably specifies (selects, determines) a transmission direction on the basis of a downlink reference configuration.

As mentioned above, the mobile station apparatus 1 specifies a period in which a transmission direction configuration is valid on the basis of an MIB transmission periodicity, and thus it is possible to reduce a probability that the mobile station apparatus 1 may erroneously perform uplink transmission.

A program which runs in the base station apparatus 3 and the mobile station apparatus 1 according to the present invention is a program (which causes a computer to function) which controls a central processing unit (CPU) and the like to realize the functions of the embodiments according to the present invention. In addition, the information treated in these devices is temporarily accumulated in a random access memory (RAM) during processing thereof, is then stored in various ROMs such as a flash read only memory (ROM) or hard disk drives (HDDs), and is read by the CPU as necessary so as to be corrected and be written.

In addition, part of the mobile station apparatus 1 and the base station apparatus 3 in the above-described embodiments may be realized by a computer. In this case, a program for realizing the control function is recorded on a computer readable recording medium, and the control function may be realized by a computer system reading and executing the program recorded on the recording medium.

In addition, the "computer system" mentioned here is a computer system which is built into the mobile station apparatus 1 or the base station apparatus 3, and includes hardware such as an OS or peripheral devices. Further, the "computer readable recording medium" refers to a portable medium such as a flexible disk, a magneto-optical disc, a ROM, or a CD-ROM, and a storage device such as a hard disk built into the computer system.

Furthermore, the "computer readable recording medium" may also include one which dynamically holds a program for a short period of time, such as a communication line in a case where the program is transmitted via a network such as the Internet or a communication line such as a telephone line, and one which holds the program for a specific time, such as a nonvolatile memory of the computer system which becomes a server or a client in this case. Moreover, the program may be one which realizes some of the above-described functions, and may be one which realizes the above-described functions in combination with a program which has already been recorded in the computer system.

In addition, the base station apparatus 3 of the above-described embodiments may be realized as an aggregate (device groups) constituted by a plurality of devices. Each of the devices constituting the device group may include each function, or some or all of the functional blocks of the base station apparatus 3 according to the embodiments. The device group may have each general function or each general functional block of the base station apparatus 3. Further, the mobile station apparatus 1 according to the above-described embodiments may communicate with the base station apparatus as an aggregate.

In addition, the base station apparatus 3 in the above-described embodiments may be an evolved universal terrestrial radio access network (EUTRAN). Further, the base station apparatus 3 in the above-described embodiments may have some or all of the functions of the higher node of eNodeB.

Further, part or the whole of the mobile station apparatus 1 and the base station apparatus 3 in the above-described embodiments may be typically implemented by an LSI which is an integrated circuit, and may be realized by a chip set. The respective functional blocks of the mobile station apparatus 1 and the base station apparatus 3 may be separately formed of a chip, and some or all of the blocks may be integrally formed as a chip. Further, a technique for an integrated circuit is not limited to an LSI, and may be realized by a dedicated circuit or a general purpose processor. Furthermore, in a case where a technique for an integrated circuit which replaces the LSI appears with the advance of semiconductor techniques, an integrated circuit based on such a technique may be used.

In addition, in the above-described embodiments, a mobile station apparatus has been described as an example of a terminal apparatus or a communication apparatus, but the present invention is not limited thereto, and is applicable to terminal apparatuses or communication apparatuses, such as non-movable or stationary electronic apparatuses installed indoors or outdoors, for example, AV apparatuses, kitchen apparatuses, cleaning and washing apparatuses, air-conditioning apparatuses, vending machines, and other pieces of household equipment.

As mentioned above, although the embodiments of the present invention have been described in detail with reference to the drawings, a specific configuration is not limited to the embodiments, and design modifications and the like may occur within the scope without departing from the spirit of the invention. In addition, various alterations may occur in the claims of the present invention, and embodiments obtained by appropriately combining technical means which are respectively disclosed in different embodiments are also included in the technical scope of the present invention. Further, configurations in which the elements which are disclosed in the above-described respective embodiments and achieve the same effect are replaced with each other are also included in the technical scope of the present invention.

DESCRIPTION OF REFERENCE NUMERALS 1 (1A, 1B, 1C) MOBILE STATION APPARATUS
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL PORTION
1013 SUBFRAME SETTING PORTION
1015 SCHEDULING INFORMATION ANALYSIS PORTION
3011 RADIO RESOURCE CONTROL PORTION
3013 SUBFRAME SETTING PORTION
3015 SCHEDULING PORTION

The invention claimed is:

1. A terminal device comprising:
configuration circuitry configured to and/or programmed to configure a plurality of subframes to monitor a plurality of physical channels, each of the plurality of subframes including information indicating an uplink-downlink configuration; and
receiving circuitry configured to and/or programmed to monitor, during a period, the information indicating the uplink-downlink configuration in each of the plurality of subframes until one information indicating an uplink-downlink configuration is detected during the period.

2. The terminal device according to claim 1, wherein
the plurality of physical channels in the plurality of subframes during the period indicate a same uplink-downlink configuration.

3. A radio communication method used for a terminal apparatus, the radio communication method comprising:
configuring a plurality of subframes to monitor a plurality of physical channels, each of the plurality of subframes including information indicating an uplink-downlink configuration; and
monitoring, during a period, the information indicating the uplink-downlink configuration in each of the plurality of subframes until one information indicating an uplink-downlink configuration is detected during the period.

4. The radio communication method according to claim 3, wherein
the plurality of physical channels in the plurality of subframes during the period indicate a same uplink-downlink configuration.

5. A integrated circuit to be mounted on a terminal device, the integrated circuit being configured to perform at least functions of:
configuring a plurality of subframes to monitor a plurality of physical channels, each of plurality of subframes including information indicating an uplink-downlink configuration; and
monitoring, during a period, the information indicating the uplink-downlink configuration in each of a the plurality of subframes until one information indicating an uplink-downlink configuration is detected during the period.

6. The integrated circuit according to claim 5, wherein
the plurality of physical channels in the plurality of subframes during the period indicate a same uplink-downlink configuration.

* * * * *